(12) United States Patent
Ogi

(10) Patent No.: US 8,593,704 B2
(45) Date of Patent: Nov. 26, 2013

(54) ERECTING EQUAL-MAGNIFICATION LENS ARRAY PLATE, OPTICAL SCANNING UNIT, IMAGE READING DEVICE, AND IMAGE WRITING DEVICE

(75) Inventor: Shuya Ogi, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 106 days.

(21) Appl. No.: 13/368,022

(22) Filed: Feb. 7, 2012

(65) Prior Publication Data

US 2012/0200899 A1   Aug. 9, 2012

(30) Foreign Application Priority Data

Feb. 8, 2011   (JP) ................................ 2011-025303

(51) Int. Cl.
    *H04N 1/04* (2006.01)
(52) U.S. Cl.
    USPC ........ 358/474; 358/509; 358/475; 359/201.1; 359/619
(58) Field of Classification Search
    USPC .................. 358/474, 475, 509; 359/622, 218, 359/201.1, 201.2, 619
    See application file for complete search history.

(56) References Cited

U.S. PATENT DOCUMENTS

| | | | |
|---|---|---|---|
| 7,006,296 B2 * | 2/2006 | Shimizu et al. | 359/619 |
| 7,705,869 B2 * | 4/2010 | Tsujino et al. | 347/238 |
| 7,777,958 B2 * | 8/2010 | Shimmo et al. | 359/622 |
| 7,903,342 B2 * | 3/2011 | Sato et al. | 359/622 |
| 7,936,516 B2 * | 5/2011 | Nagata | 359/621 |
| 7,995,085 B2 * | 8/2011 | Nomura | 347/238 |
| 8,077,407 B2 * | 12/2011 | Shimmo et al. | 359/811 |
| 8,184,140 B2 * | 5/2012 | Sowa et al. | 347/238 |
| 8,238,028 B2 * | 8/2012 | Shiraishi | 359/622 |
| 8,362,255 B2 * | 1/2013 | Rock et al. | 546/218 |
| 8,446,647 B2 * | 5/2013 | Mamada et al. | 358/475 |

FOREIGN PATENT DOCUMENTS

JP   2009-069801 A   4/2009

\* cited by examiner

*Primary Examiner* — Negussie Worku
(74) *Attorney, Agent, or Firm* — Sughrue Mion, PLLC

(57) ABSTRACT

An erecting equal-magnification lens array plate comprises first and second lens array plates stacked on one another, a fourth surface light-shielding wall, and an intermediate light-shielding wall. An intermediate through hole formed in the intermediate light-shielding wall is formed such that the hole diameter is progressively smaller in a tapered fashion away from the first lens array plate toward the second lens array plate. An angle of inclination θ of an interior wall surface of the intermediate through hole with respect to a optical axis is given by $$\theta \geq \tan^{-1}(D4/(Gap+L2+H4))/2$$

where Gap denotes a gap between the lens array plates, L2 denotes a thickness of the second lens array plate, H4 denotes a height of the fourth surface light-shielding wall, and D4 denotes a diameter of the opening of the fourth surface through hole formed in the fourth surface light-shielding wall facing the image plane.

12 Claims, 17 Drawing Sheets

ERECTING EQUAL-MAGNIFICATION LENS ARRAY PLATE, OPTICAL SCANNING UNIT, IMAGE READING DEVICE, AND IMAGE WRITING DEVICE

BACKGROUND OF THE INVENTION

1. Field of the Invention

The present invention relates to an erecting equal-magnification lens array plate used in image reading devices and image writing devices.

2. Description of the Related Art

Some image reading devices such as scanners are known to use erecting equal-magnification optics. Erecting equal-magnification optics is capable of reducing the size of devices better than reduction optics. In the case of image reading devices, an erecting equal-magnification optical system comprises a linear light source, an erecting equal-magnification lens array, and a linear image sensor.

A rod lens array capable of forming an erect equal-magnification image is used as an erecting equal-magnification lens array in an erecting equal-magnification optical system. Normally, a rod lens array comprises an arrangement of rod lenses in the longitudinal direction (main scanning direction of the image reading device) of the lens array. By increasing the number of rows of rod lenses, the proportion of light transmitted is improved and unevenness in the amount of light transmitted is reduced. Due to price concerns, it is common to use one or two rows of rod lenses in an array.

Meanwhile, an erecting equal-magnification lens array plate could be formed as a stack of two transparent lens array plates built such that the light axes of individual convex lenses are aligned, where each transparent lens array plate includes a systematic arrangement of micro-convex lenses on both surfaces of the plate. Since an erecting equal-magnification lens array plate such as this can be formed by, for example, injection molding, an erecting equal-magnification lens array can be manufactured at a relatively low cost.

An erecting equal-magnification lens array plate lacks a wall for beam separation between adjacent lenses. Therefore, there is a problem of stray light wherein a light beam diagonally incident on an erecting equal-magnification lens array plate travels diagonally inside the plate and enters an adjacent convex lens, creating ghost noise as it leaves the plate.

There is known an erecting equal-magnification lens array plate in which a light-shielding wall for removing ghost noise is provided between two lens array plates (see, for example, patent document No. 1).

[patent document No. 1] JP2009-069801

However, when a light-shielding wall is provided between two lens array plates, light reflected by the light-shielding wall may produce flare noise.

SUMMARY OF THE INVENTION

The present invention addresses the background and a purpose thereof is to provide an erecting equal-magnification lens array plate capable of reducing flare noise, and an optical scanning unit, an image reading device, an image writing device in which such a plate is used.

In order to resolve the above-discussed problem, the erecting equal-magnification lens array plate according to one embodiment of the present invention comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface. The first lens array plate and the second lens array plate form a stack such that the second surface and the third surface face each other to ensure that a combination of the lenses aligned with each other form a coaxial lens system, and an erect equal-magnification image of an object on the first surface side on an image plane facing the fourth surface. The erecting equal-magnification lens array plate further comprises: a fourth surface light-shielding wall provided with a plurality of fourth surface through holes corresponding to the fourth lenses and provided on the fourth surface such that the fourth surface through holes are located directly opposite to the corresponding fourth lenses; and an intermediate light-shielding wall provided with a plurality of intermediate through holes corresponding to the second and third lenses and provided between the first lens array plate and the second lens array plate such that the intermediate through holes are located directly opposite to the corresponding second and third lenses. The intermediate through hole is formed such that the hole diameter is progressively smaller in a tapered fashion away from the second surface toward the third surface, and an angle of inclination $\theta$ of an interior wall surface of the intermediate through hole with respect to a optical axis is given by $\theta \geq \tan^{-1}(D4/(Gap+L2+H4))/2$, where Gap denotes a gap between the first lens array plate and the second lens array plate, L2 denotes a thickness of the second lens array plate, H4 denotes a height of the fourth surface light-shielding wall, and D4 denotes a diameter of the opening of the fourth surface through hole facing the image plane.

The angle of inclination $\theta$ of an interior wall surface of the intermediate through hole with respect to a optical axis may be given by $\tan^{-1}(D4/(Gap+L2+H4))/2 \leq \theta \leq \tan^{-1}((P+D4)/2/(Gap+L2+H4))$.

The erecting equal-magnification lens array plate may further comprise: a first surface light-shielding wall provided with a plurality of first surface through holes corresponding to the first lenses and provided on the first surface such that the first surface through holes are located directly opposite to the corresponding first lenses.

Another embodiment of the present invention also relates to an erecting equal-magnification lens array plate. The erecting equal-magnification lens array plate comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface. The first lens array plate and the second lens array plate form a stack such that the second surface and the third surface face each other to ensure that a combination of the lenses aligned with each other form a coaxial lens system, and an erect equal-magnification image of an object on the first surface side on an image plane facing the fourth surface. The erecting equal-magnification lens array plate further comprises: a first surface light-shielding wall provided with a plurality of first surface through holes corresponding to the first lenses and provided on the first surface such that the first surface through holes are located directly opposite to the corresponding first lenses, an intermediate light-shielding wall provided with a plurality of intermediate through holes corresponding to the second and third lenses and provided between the first lens array plate and the second lens array plate such that the intermediate through holes are located directly opposite to the corresponding second and third lenses. The intermediate through hole is formed such that the hole diameter is progressively larger in an inversely tapered fashion away from the second surface toward the third surface, and an angle of inclination θ of an interior wall surface of the intermediate through hole with respect to a optical axis is given by $\theta \geq \tan^{-1}(D1/(Gap+L1+H1))/2$, where Gap denotes a gap between the first lens array plate and the second lens array plate, L1 denotes a thickness of the first lens array plate, H1 denotes a height of the first surface light-shielding wall, and D1 denotes a diameter of the opening of the first surface through hole facing the object plane.

The angle of inclination θ of an interior wall surface of the intermediate through hole with respect to a optical axis is given by $\tan^{-1}(D1/(Gap+L1+H1))/2 \leq \theta \leq \tan^{-1}((P+D1)/2/(Gap+L1+H1))$.

The erecting equal-magnification lens array plate may further comprise: a fourth surface light-shielding wall provided with a plurality of fourth surface through holes corresponding to the fourth lenses and provided on the fourth surface such that the fourth surface through holes are located directly opposite to the corresponding fourth lenses.

Still another embodiment of the present invention relates to an optical scanning unit. The optical scanning unit comprises: a linear light source configured to illuminate an original to be read; the erecting equal-magnification lens array plate according to claim 1 configured to condense light reflected by the original to be read; and a linear image sensor configured to receive light transmitted by the erecting equal-magnification lens array plate.

Yet another embodiment of the present invention relates to an image reading device. The device comprises: the aforementioned optical scanning unit; and an image processing unit configured to process an image signal detected by the optical scanning unit.

Still another embodiment of the present invention relates to an image writing device. The device comprises: an LED array comprising an array of a plurality of LED's; the aforementioned erecting equal-magnification lens array plate for condensing light emitted from the LED array; and a photosensitive drum for receiving the light transmitted through the erecting equal-magnification lens array plate.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
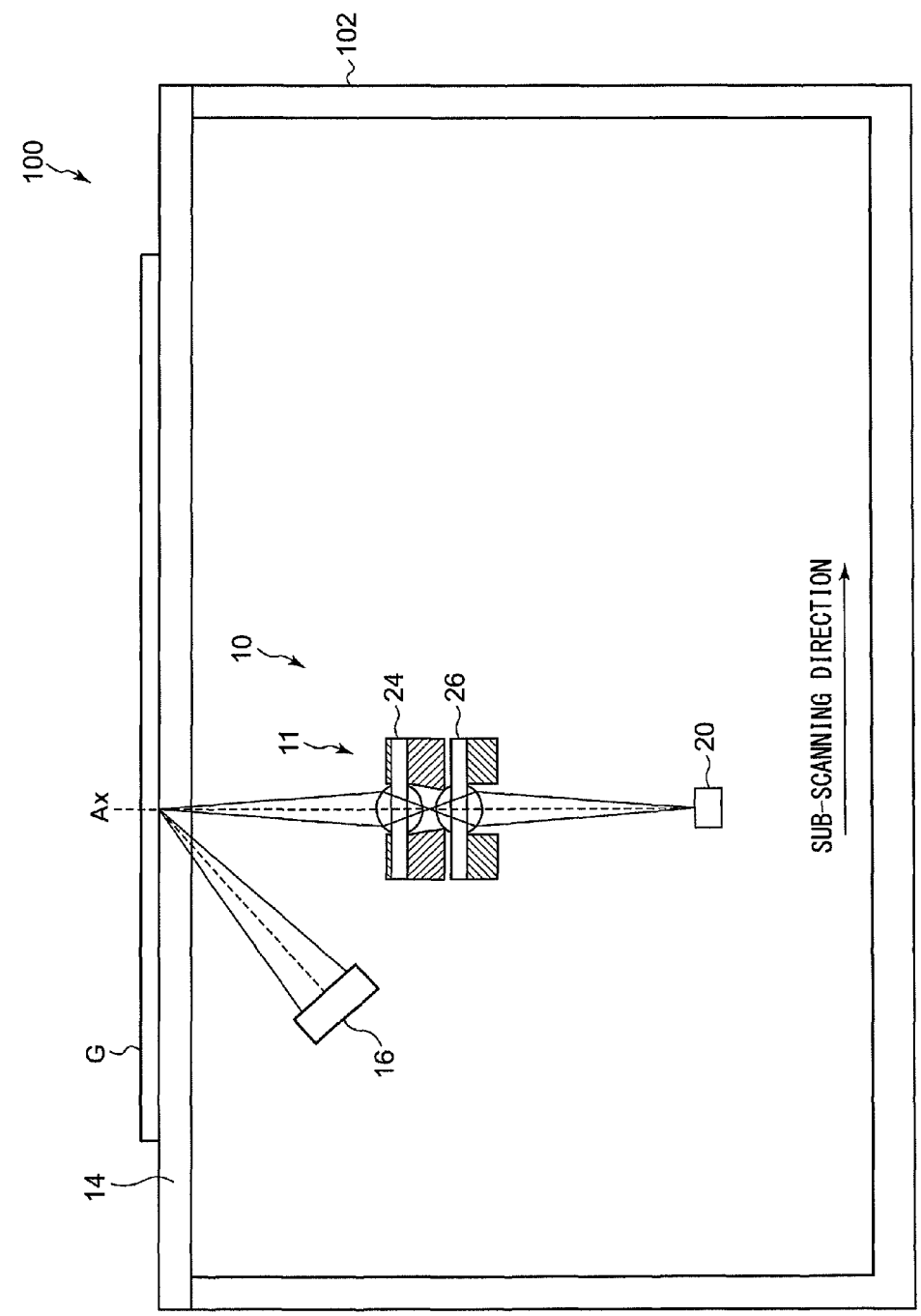
FIG. 1 shows an image reading device according to an embodiment of the present invention.

FIG. 1 shows an image reading device 100 according to an embodiment of the present invention. As shown in FIG. 1, the image reading device 100 comprises a housing 102, a glass plate 14 on which a document G is placed, an optical scanning unit 10 accommodated in the housing 102, a driving mechanism (not shown) for driving the optical scanning unit 10, and an image processing unit (not shown) for processing data read by the optical scanning unit 10.

The optical scanning unit 10 comprises a linear light source 16 for illuminating a document G placed on a glass plate 14, an erecting equal-magnification lens array plate 11 for condensing light reflected from the document G, a linear image sensor (photoelectric transducer) 20 for receiving light condensed by the erecting equal-magnification lens array plate 11, and a case (not shown) for fixing the linear light source 16, the erecting equal-magnification lens array plate 11, and the linear image sensor 20.

The linear light source 16 is a light source emitting a substantially straight light. The linear light source 16 is secured such that the optical axis thereof passes through the intersection of the optical axis Ax of the erecting equal-magnification lens array plate 11 and the top surface of the glass plate 14. The light exiting from the linear light source 16 illuminates the document G placed on the glass plate 14. The light illuminating the document G is reflected by the document G toward the erecting equal-magnification lens array plate 11.

The erecting equal-magnification lens array plate 11 comprises a stack of a first lens array plate 24 and a second lens array plate 26 built such that pairs of corresponding lenses form a coaxial lens system, where each lens array plate is formed with a plurality of convex lenses on both surfaces of the plate, as described later. The first lens array plate 24 and the second lens array plate 26 are held by a holder (not shown) in a stacked state. The erecting equal-magnification lens array plate 11 is installed in the image reading device 100 such that the longitudinal direction thereof is aligned with the main scanning direction and the lateral direction thereof is aligned with the sub-scanning direction.

The erecting equal-magnification lens array plate 11 is configured to receive line light reflected from the document G located above and form an erect equal-magnification image on an image plane located below, i.e., a light-receiving surface of the linear image sensor 20. The image reading device 100 can read the document G by scanning document G with the optical scanning unit 10 in the sub-scanning direction.

Figure 2:
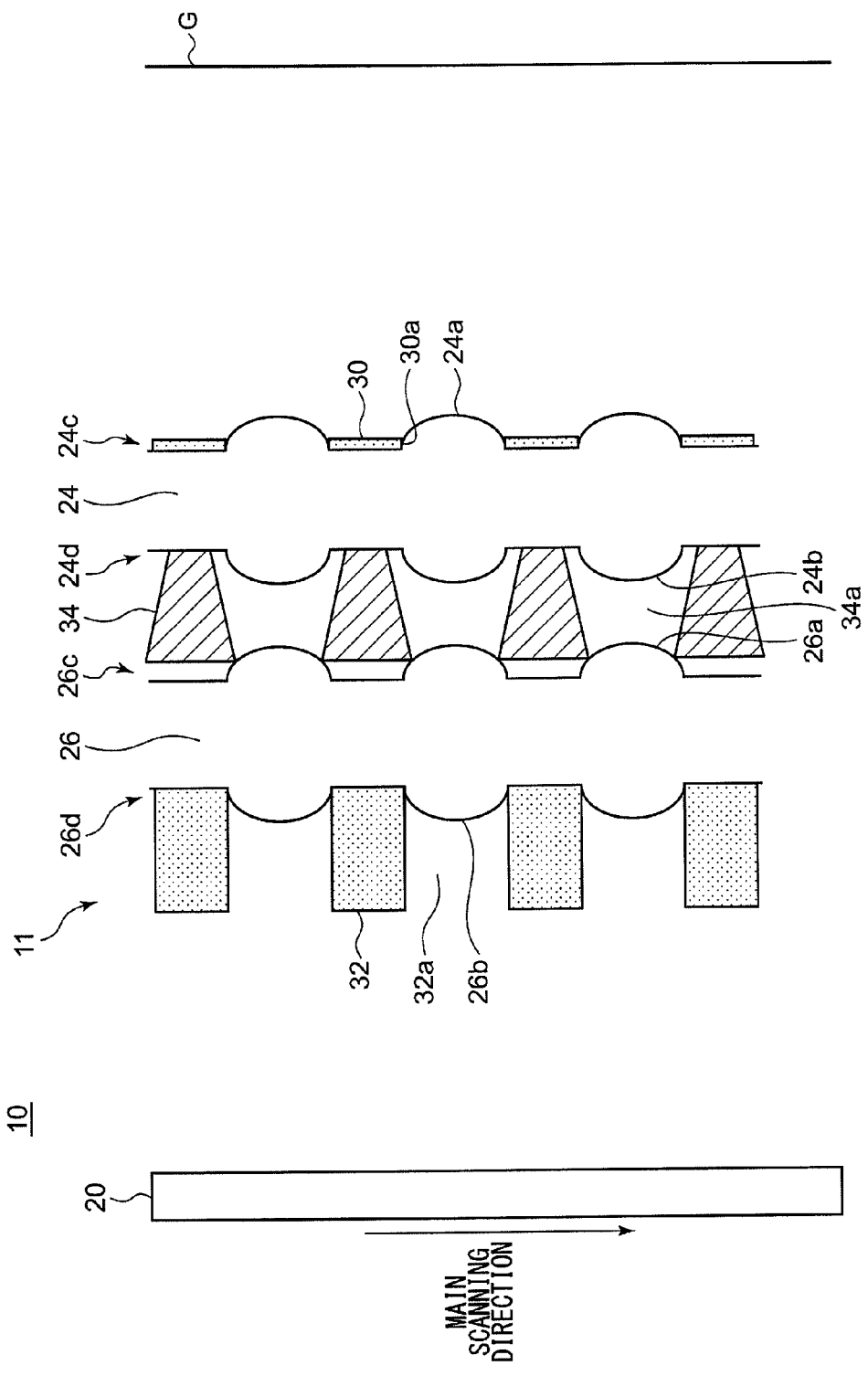
FIG. 2 shows a partial section of the optical scanning unit in the main scanning direction.

FIG. 2 shows a partial section of the optical scanning unit in the main scanning direction. Referring to FIG. 2, the vertical direction in the illustration represents main scanning direction (longitudinal direction) of the erecting equal-magnification lens array plate 11 and the depth direction in the illustration represents the sub-scanning direction (lateral direction).

As described above, the erecting equal-magnification lens array plate 11 comprises a stack of the first lens array plate 24 and the second lens array plate 26. Each of the first lens array plate 24 and the second lens array plate 26 is a rectangular plate and is provided with an arrangement of a plurality of convex lenses on both sides thereof.

The first lens array plate 24 and the second lens array plate 26 are formed by injection molding. Preferably, each of the first lens array plate 24 and the second lens array plate 26 is formed of a material amenable to injection molding, having high light transmittance in a desired wavelength range, and having low water absorption. Desired materials include cycloolefin resins, olefin resins, norbornene resins, and polycarbonate.

A plurality of first lenses 24a are arranged in a single line on a first surface 24c (one of the surfaces of the first lens array plate 24) in the longitudinal direction of the first lens array plate 24. A plurality of second lenses 24b are arranged in a single line on a second surface 24d of the first lens array plate 24 opposite to the first surface 24c in the longitudinal direction of the first lens array plate 24.

A plurality of third lenses 26a are arranged in a single line on a third surface 26c (one of the surfaces of the second lens array plate 26) in the longitudinal direction of the second lens array plate 26. A plurality of fourth lenses 26b are arranged in a single line on a fourth surface 26d opposite to the third surface 26c in the longitudinal direction of the second lens array plate 26.

In this embodiment, it is assumed that the first lens 24a, the second lens 24b, the third lens 26a, and the fourth lens 26b are spherical in shape. Alternatively, the lenses may have aspherical shapes.

The first lens array plate 24 and the second lens array plate 26 form a stack such that the second surface 24d and the third surface 26c face each other to ensure that a combination of the first lens 24a, the second lens 24b, the third lens 26a, and the fourth lens 26b aligned with each other form a coaxial lens system. In other words, the first and second lens array plates 24 and 26 form a stack such that the light axes of the first, second, third, and fourth lenses 24a, 24b, 26a, and 26b aligned with each other are aligned.

A first surface light-shielding wall 30 is provided on the first surface 24c of the first lens array plate 24. The first surface light-shielding wall 30 is a light-shielding member of a film form made of a light-shielding material and is formed with a plurality of first surface through holes 30a. The first surface through holes 30a are arranged in a single line in the longitudinal direction of the first surface light-shielding wall 30 so as to be in alignment with the first lenses 24a of the first lens array plate 24. The hole diameter of the first surface through hole 30a is identical to the effective diameter of the first lens 24a. The first surface light-shielding wall 30 is provided on the first surface 24c of the first lens array plate 24 such that each first surface through hole 30a is located directly opposite to the corresponding first lens 24a. In other words, the first surface light-shielding wall 30 is provided on the first surface 24c such that the central axis of each first surface through hole 30a is aligned with the optical axis of the corresponding first lens 24a. As shown in FIG. 2, the area (hereinafter, also referred to as "first surface flat area") on the first surface 24c outside the effective region of the first lenses 24a is covered by the first surface light-shielding wall 30. The term "effective region of a lens" refers to a portion having the function of a lens. The first surface light-shielding wall 30 shields light through the first surface flat area not contributing to imaging. The first surface light-shielding wall 30 may be formed by printing the first surface 24c with a light-shielding pattern using a light-absorbing material such as black ink.

A fourth surface light-shielding wall 32 is provided on the fourth surface 26d of the second lens array plate 26. The fourth surface light-shielding wall 32 is a light-shielding member of a plate form made of a light-shielding material and is formed with a plurality of fourth surface through holes 32a. The fourth surface through holes 32a are arranged in a single line in the longitudinal direction of the fourth surface light-shielding wall 32 so as to be in alignment with the fourth lenses 26b of the second lens array plate 26. The fourth surface through hole 32a is cylindrically formed and the hole diameter thereof is identical to the effective diameter of the fourth lens 26b. The fourth surface light-shielding wall 32 is provided on the fourth surface 26d such that each fourth surface through hole 32a is located directly opposite to the corresponding fourth lens 26b. In other words, the fourth surface light-shielding wall 32 is provided on the fourth surface 26d such that the central axis of each fourth surface through hole 32a is aligned with the optical axis of the corresponding fourth lens 26b. As shown in FIG. 2, the area (hereinafter, also referred to as "fourth surface flat area") on the fourth surface 26d outside the effective region of the fourth lenses 26b is covered by the fourth surface light-shielding wall 32.

In this embodiment, the first surface light-shielding wall 30 is configured in a "film form" and the fourth surface light-shielding wall 32 is configured in a "plate form". This means that the first surface light-shielding wall 30 is far thinner than the fourth surface light-shielding wall 32. In other words, the term "film" means that the thickness is negligibly small.

As shown in FIG. 2, an intermediate light-shielding wall 34 is provided between the first lens array plate 24 and the second lens array plate 26. The intermediate light-shielding wall 34 is a light-shielding member of a plate form made of a light-shielding material and is formed with a plurality of intermediate through holes 34a. The intermediate through holes 34a are arranged in a single line in the longitudinal direction of the intermediate light-shielding wall 34 so as to be in alignment with the second lenses 24b and the third lenses 26a. In this embodiment, the intermediate through hole 34a is formed as a circular truncated cone such that the hole diameter is progressively smaller in a tapered fashion away from the second surface 24d toward the third surface 26c. The intermediate light-shielding wall 34 is provided between the first lens array plate 24 and the second lens array plate 26 such that each intermediate through hole 34a is located directly opposite to the corresponding second lens 24b and the third lens 26a. In other words, the intermediate light-shielding wall 34 is provided between the first lens array plate 24 and the second lens array plate 26 such that the central axis of each intermediate through hole 34a is aligned with the optical axis of the corresponding second lens 24b and third lens 26a. The intermediate light-shielding wall 34 has the function of shielding stray light not contributing to imaging and reducing ghost noise.

Preferably, the fourth surface light-shielding wall 32 and the intermediate light-shielding wall 34 may be formed by, for example, injection molding, using a light absorbing material such as black ABS resin. Further, the fourth surface light-shielding wall 32 and the intermediate light-shielding wall 34 may be formed by stacking a black resin paint.

The erecting equal-magnification lens array plate 11 as configured above is built in the image reading device 100 such that the distance from the first lens 24a to the document G and the distance from the fourth lens 26b to the linear image sensor 20 are equal to a predetermined working distance WD.

Figure 3:
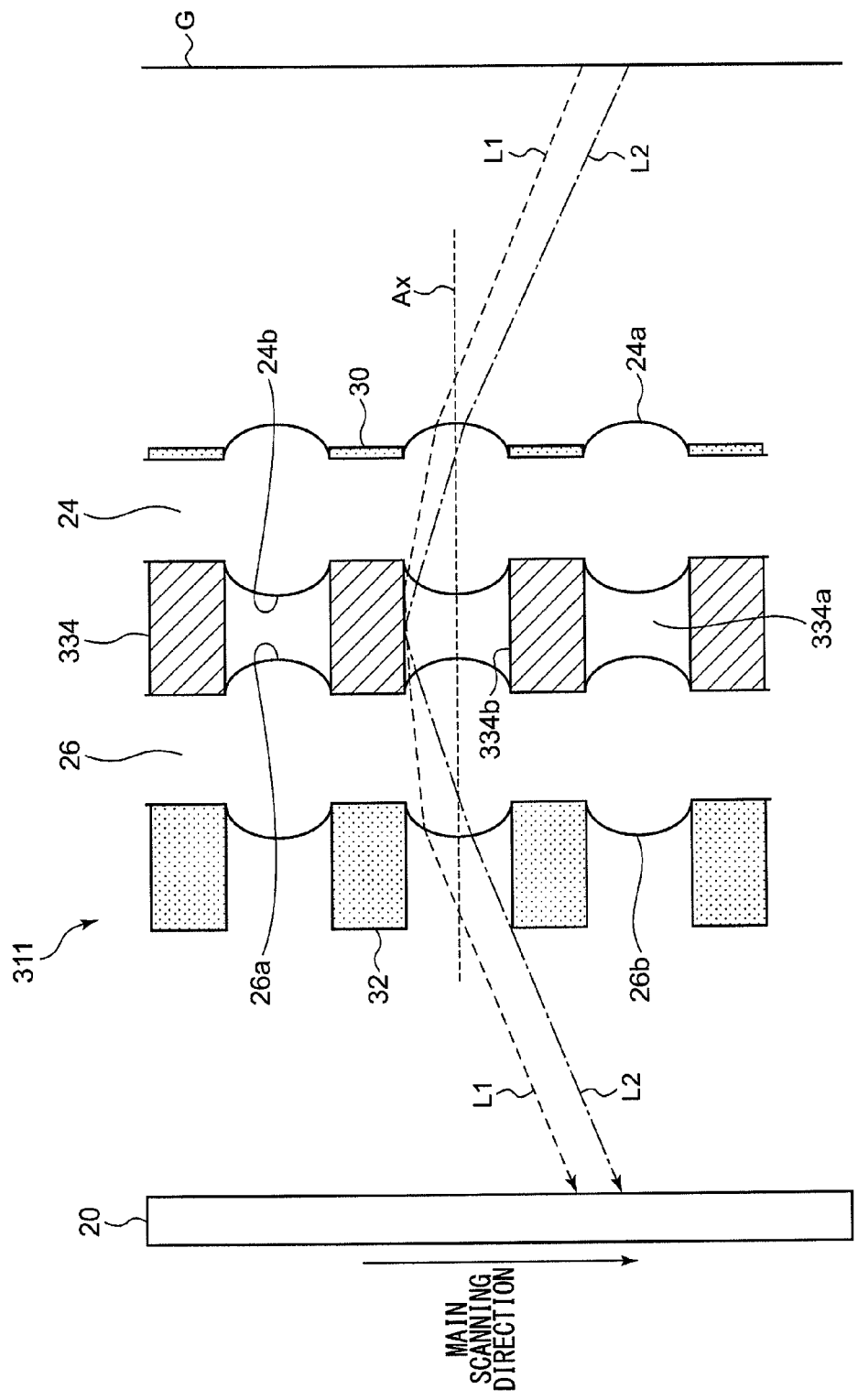
FIG. 3 shows the operation of an erecting equal-magnification lens array plate according to a comparative example.

A description will now be given of the operation of the erecting equal-magnification lens array plate 11 according to the embodiment. Before describing the operation of the erecting equal-magnification lens array plate 11, a comparative example will be shown. FIG. 3 shows the operation of an erecting equal-magnification lens array plate 311 according to the comparative example. In the erecting equal-magnification lens array plate 311 according to the comparative example, the shape of the intermediate through hole 334a of the intermediate light-shielding wall 334 is different from that of the erecting equal-magnification lens array plate 11 according to the embodiment. In the erecting equal-magnification lens array plate 311 according to the comparative example, the intermediate through hole 334a is formed in a cylindrical shape. In other words, an interior wall surface 334b of the intermediate through hole 334a of the erecting equal-magnification lens array plate 311 is parallel to the optical axis Ax of the lens.

FIG. 3 shows optical paths of a beam L1 (broken line) emitted from the document G and a beam L2 (chain line) emitted from the document G. The intermediate light-shielding wall 334 has the function of preventing beams like the beams L1 and L2 diagonally traveling in the first lens array plate 24 and exiting the second lens 24b from entering the adjacent second lens array plate 26. However, the beam incident on the interior wall surface 334b of the intermediate through hole 334a is not completely absorbed even if a light absorbing material is used. The beam is partly reflected by the interior wall surface 334b (Fresnel reflection) and is incident on the third lens 26a. This is because, the Fresnel reflectance for an large angle of incidence close to 90° of the beams L1 and L2, which is incident on the interior wall surface 334b of the intermediate through hole 334a, is extremely large. The beams L1 and L2 reflected by the interior wall surface 334b of the intermediate through hole 334a are transmitted through the third lens 26a and the fourth lens 26b before being incident on the linear image sensor 20, causing flare noise.

Figure 4:
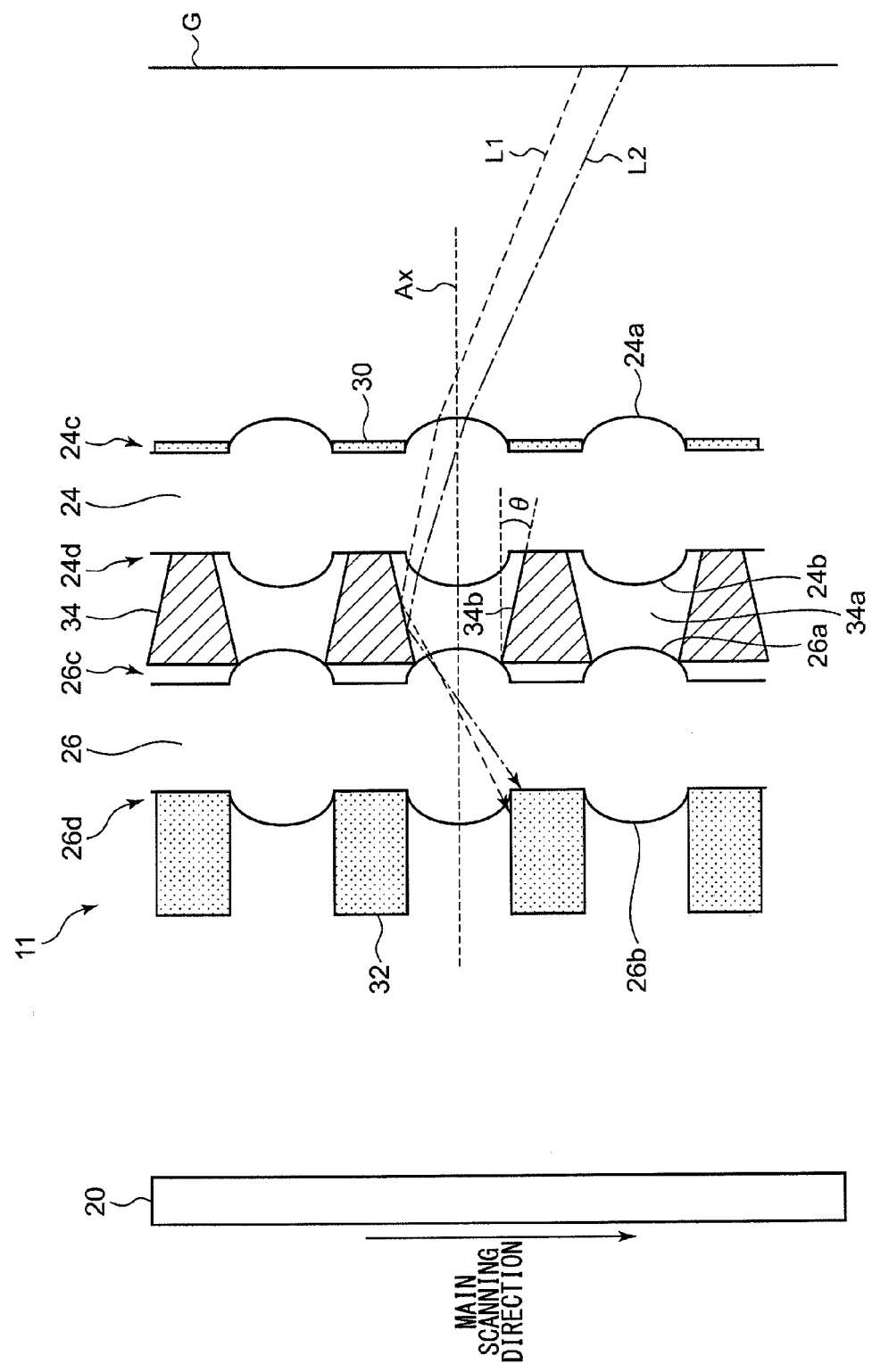
FIG. 4 shows the operation of the erecting equal-magnification lens array plate according to the embodiment.

FIG. 4 shows the operation of the erecting equal-magnification lens array plate 11 according to the embodiment. Like FIG. 3, FIG. 4 shows optical paths of a beam L1 (broken line) and a beam L2 (chain line) emitted from the document G. In this embodiment, the intermediate through hole 34a is formed as a circular truncated cone such that the hole diameter is progressively smaller in a tapered fashion away from the second surface 24d toward the third surface 26c. In other words, the interior wall surface 34b of the intermediate through hole 34a is inclined with respect to the optical axis Ax of the lens. Due to the inclination of the interior wall surface 34b, the angle of reflection of the beams L1 and L2 at the interior wall surface 34b of the intermediate through hole 34a is smaller than that of the comparative example shown in FIG. 3. The angle of reflection is defined as an angle formed by the normal to the interior wall surface 34b and the reflected beam. Given that the angle of inclination of the interior wall surface 34b with respect to the optical axis Ax is θ, it is ensured that the angle of reflection of the beams L1 and L2 is smaller by 2θ than the angle of reflection in the comparative example of FIG. 3 by tapering the interior wall surface 34b by θ with respect to the optical axis Ax. Due to the smaller angle of reflection, the beams L1 and L2 impinge on the fourth surface light-shielding wall 32 and are attenuated. Therefore, according to the embodiment, the beams L1 and L2 do not substantially reach the linear image sensor 20 so that flare noise is prevented.

Figure 5A:
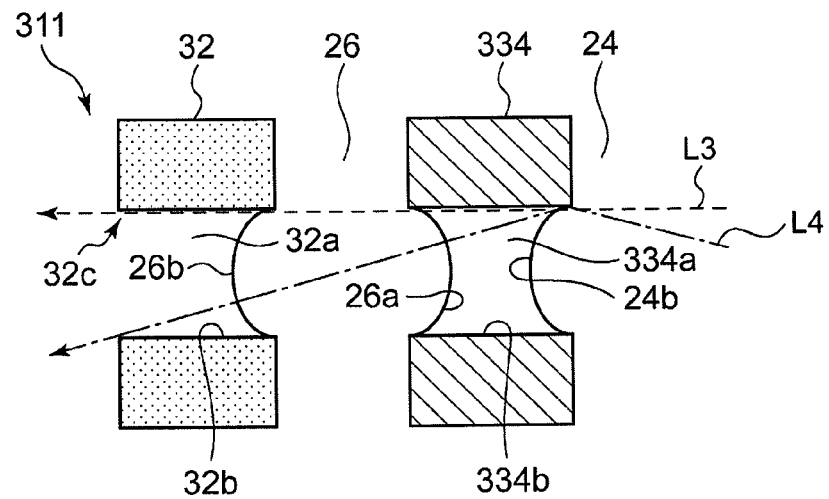
FIGS. 5A and 5B show a lower limit value of the angle of inclination of the interior wall surface of the intermediate through hole necessary for elimination of flare noise.
Figure 5B:
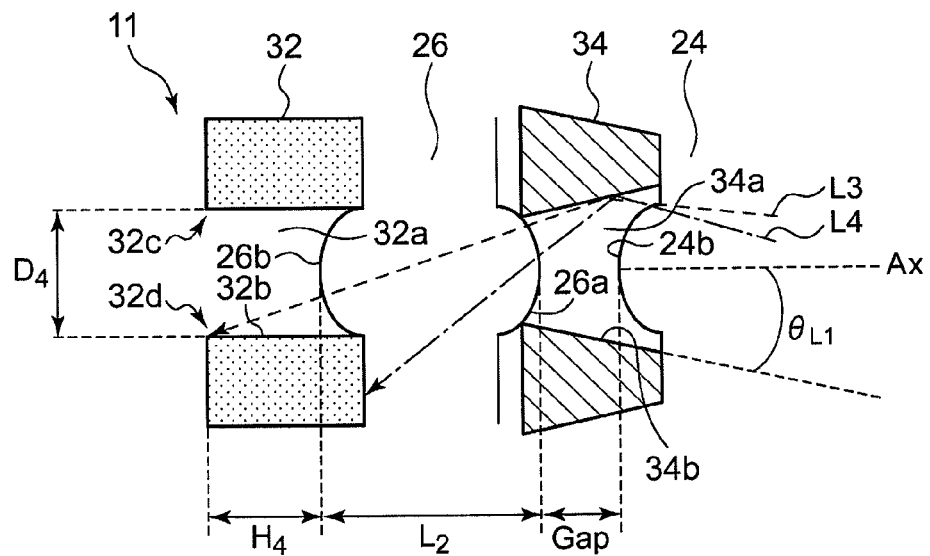

FIGS. 5A and 5B show a lower limit value $\theta_{L1}$ of the angle of inclination θ of the interior wall surface 34b of the intermediate through hole 34a necessary for elimination of flare noise. FIG. 5A shows a part of the erecting equal-magnification lens array plate 311 according to the comparative example, and FIG. 5B shows a part of the erecting equal-magnification lens array plate 11 according to the embodiment.

FIG. 5A shows the erecting equal-magnification lens array plate 311 according to the comparative example in which a beam L3 is reflected in the vicinity of the edge of the interior wall surface 334b of the intermediate through hole 334a toward the second surface and narrowly passes through an open end edge 32c of the fourth surface through hole 32a facing the image plane. It will be considered that the beam L3 is incident on the erecting equal-magnification lens array plate 11 according to the embodiment. As the angle of inclination of the interior wall surface 34b of the intermediate through hole 34a is increased, the beam L3 is directed away from the open end edge 32c of the fourth surface through hole 32a facing the image plane toward an open end edge 32d facing the image plane and opposite to the open end edge 32c across the fourth surface through hole 32a. Therefore, the beam L3 is prevented from reaching the linear image sensor 20 by inclining the interior wall surface 34b of the intermediate through hole 34a with respect to the optical axis Ax such that the beam L3 impinges on the interior wall surface 32b at the open end edge 32d facing the image plane. The angle of inclination $θ_{L1}$ of the interior wall surface 34b of the intermediate through hole 34a represents the lower limit value of the angle of inclination necessary for elimination of flare noise. The angle of inclination $θ_{L1}$ is given by the following expression (1).

$$θ_{L1} ≈ \tan^{-1}(D4/(Gap+L2+H4))/2 \quad (1)$$

where Gap denotes a gap between the first lens array plate 24 and the second lens array plate 26, L2 denotes the thickness of the second lens array plate 26, H4 denotes a height of the fourth surface light-shielding wall 32, and D4 denotes the diameter of the opening of the fourth surface through hole 32a facing the image plane. Therefore, the angle of inclination θ of the interior wall surface 34b of the intermediate through hole 34a should meet the following expression (2).

$$θ ≥ \tan^{-1}(D4/(Gap+L2+H4))/2 \quad (2)$$

Figure 6:
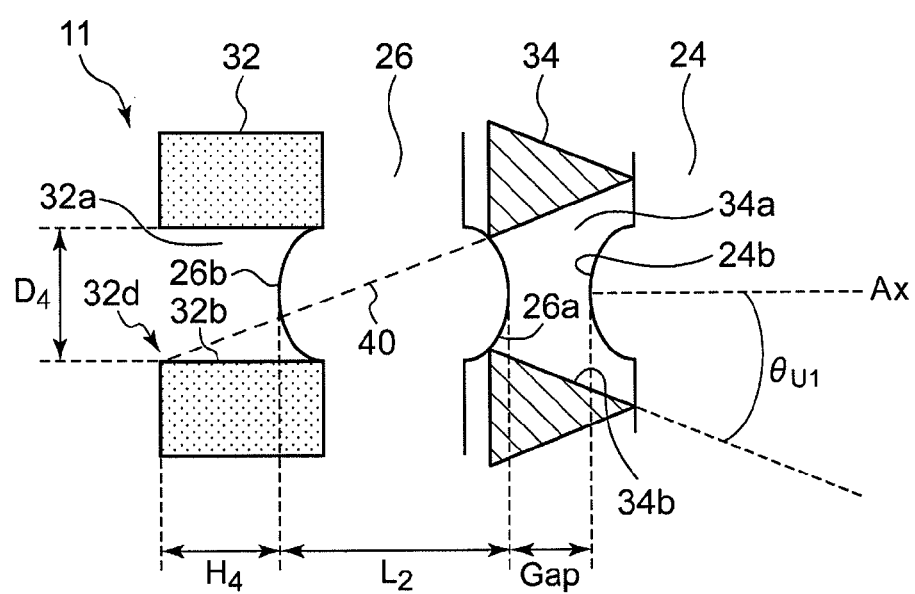
FIG. 6 shows an upper limit value of the angle of inclination of the interior wall surface of the intermediate through hole.

FIG. 6 shows an upper limit value θU1 of the angle of inclination θ of the interior wall surface 34b of the intermediate through hole 34a. An attempt to ensure an excessively large angle of inclination θ of the interior wall surface 34b of the intermediate through hole 34a would require an excessively large lens arrangement pitch with respect to the lens diameter or an excessively small diameter of the opening of the intermediate through hole 34a at the third surface with respect to the lens diameter. However, such features might reduce the amount of light significantly so that the angle of inclination θ of the interior wall surface 34b of the intermediate through hole 34a should not be larger than necessary. For determination of the angle of inclination θ of the interior wall surface 34b sufficient to eliminate flare noise, a line 40 extended from the interior wall surface 34b of the intermediate through hole 34a is assumed to touch the interior wall surface 32b at the open end edge 32d of the fourth surface through hole 32a facing the image plane, as shown in FIG. 6. In this case, the entirety of the beam reflected by the interior wall surface 34b of the intermediate through hole 34a impinges on the fourth surface light-shielding wall 32 and is attenuated accordingly. Accordingly, the angle of inclination θU1 of the interior wall surface 34b that meets the above condition can be considered to be the upper limit angle beyond which flare noise cannot be eliminated any further even if the angle of inclination θ is increased. The larger the diameter of the opening of the intermediate through hole 34a at the second surface, the larger the angle of inclination θ of the interior wall surface 34b that meets the above condition. The maximum value of the diameter of the opening at the second surface is equal to the lens arrangement pitch. Therefore, the angle of inclination θU1 is given by the following expression (3).

$$θU1 ≈ \tan^{-1}((P+D4)/2/(Gap+L2+H4)) \quad (3)$$

where P denotes the interval of arrangement of the first through fourth lenses. Therefore, it is desired that the angle of inclination θ of the interior wall surface 34b of the intermediate through hole 34a meet the following expression (4).

$$θ ≤ \tan^{-1}((P+D4)/2/(Gap+L2+H4)) \quad (4)$$

Taking the expression (2) and (4) together, it is desired that the angle of inclination θ of the interior wall surface 34b of the intermediate through hole 34a meet the following expression (5).

$$\tan^{-1}(D4/(Gap+L2+H4))/2 ≤ θ ≤ \tan^{-1}((P+D4)/2/(Gap+L2+H4)) \quad (5)$$

As described above, according to the erecting equal-magnification lens array plate 11 of the embodiment, flare noise caused by reflection at the intermediate light-shielding wall 34 is reduced by forming the intermediate through hole 34a of the intermediate light-shielding wall 34 as a circular truncated cone such that the hole diameter is progressively smaller in a tapered fashion away from the second surface 24d toward the third surface 26c. Therefore, the image reading device 100 in which the erecting equal-magnification lens array plate 11 is used can read a proper image in which flare noise is reduced.

In this embodiment, the first surface light-shielding wall 30 is a light-shielding member of a film form. Alternatively, the first surface light-shielding wall 30 may be a light-shielding member of a plate form. In this case, ghost noise is further reduced.

In this embodiment, the fourth surface through hole 32a is cylindrically formed. Alternatively, the fourth surface through hole 32a may be formed as a circular truncated cone. In other words, the diameter of the opening of the fourth surface through hole 32a facing the image plane and that of the opening at the fourth surface may be different. Similarly, if the first surface light-shielding wall 30 is a light-shielding member of a plate form, the first surface through hole 30a may be cylindrically formed or formed as a circular truncated cone.

Figure 7:
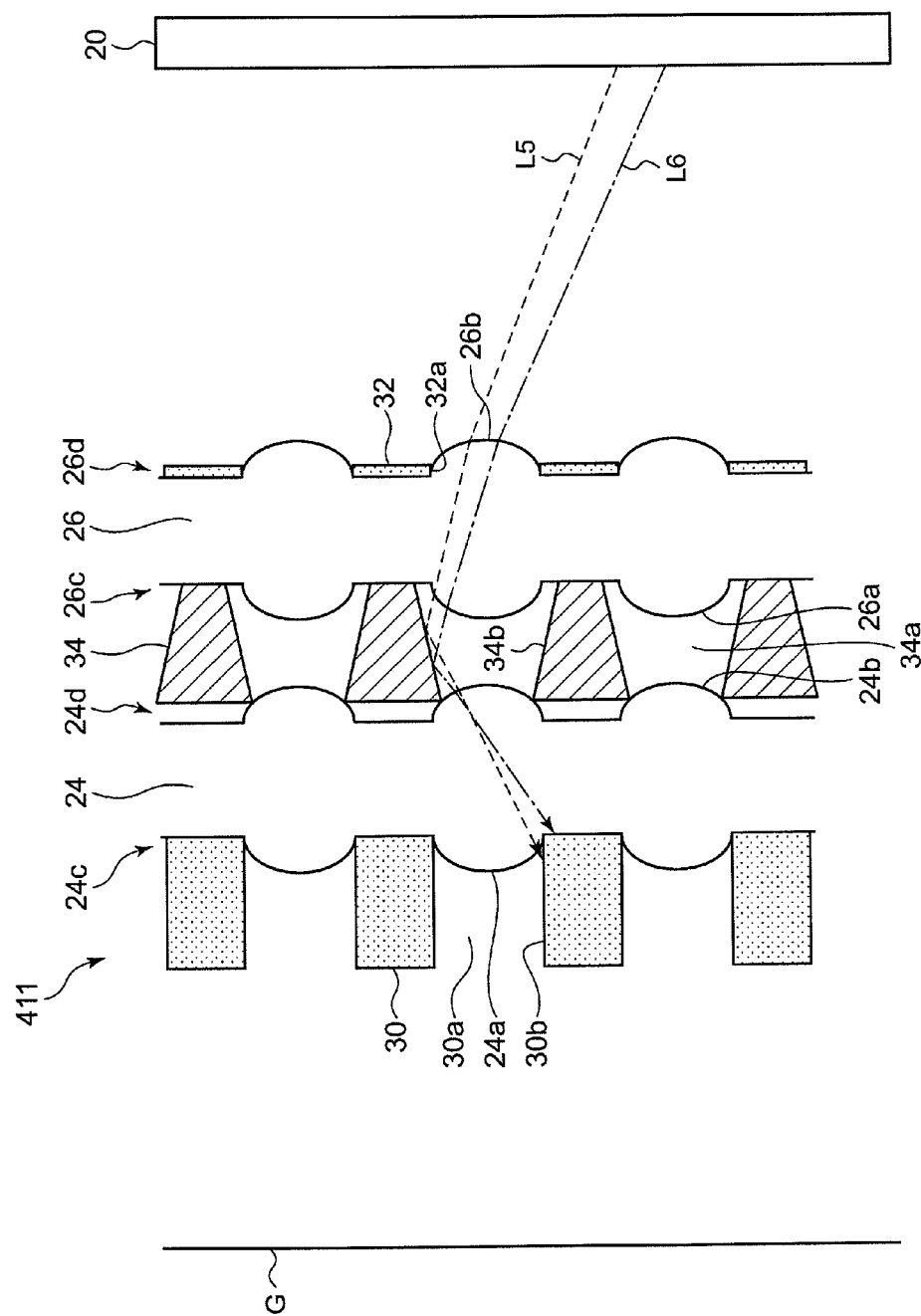
FIG. 7 shows an erecting equal-magnification lens array plate according to another embodiment of the present invention.

FIG. 7 shows an erecting equal-magnification lens array plate 411 according to another embodiment of the present invention. The erecting equal-magnification lens array plate 411 according to the embodiment differs from the erecting equal-magnification lens array plate 11 shown in FIG. 2 in that the first surface light-shielding wall 30 of a plate form is provided on the first surface 24c of the first lens array plate 24, and the fourth surface light-shielding wall 32 of a film form is provided on the fourth surface 26d of the second lens array plate 26. Further, the intermediate through hole 34a of the erecting equal-magnification lens array plate 411 of the embodiment is formed as a circular truncated cone such that the hole diameter is progressively larger in an inversely tapered fashion away from the second surface 24d toward the third surface 26c. In other words, the interior wall surface 34b of the intermediate through hole 34a is inclined with respect to the optical axis Ax of the lens. The other components are similar to those of the erecting equal-magnification lens array plate 11 shown in FIG. 2 so that like numerals represent like elements and the description is omitted as appropriate. It should be noted that FIG. 7 shows the document G, the linear image sensor 20, etc. with left and right reversed.

A description will now be given of the operation of the erecting equal-magnification lens array plate 411. For convenience of explanation, a beam L5 (broken line) and a beam L6 (chain line) exiting from the linear image sensor 20 will be considered. As shown in FIG. 7, the beams L5 and L6 travel diagonally in the second lens array plate 26 and are reflected by the interior wall surface 34b of the intermediate light-shielding wall 34. The beams L5 and L6 travel diagonally in the first lens array plate 24 before impinging on the first surface light-shielding wall 30. This means that there are no paths in which the beam exiting from the document G reaches the linear image sensor 20. Therefore, according to the erecting equal-magnification lens array plate 411 of the embodiment, flare noise caused by reflection at the interior wall surface 34b of the intermediate through hole 34a is reduced.

Figure 8:
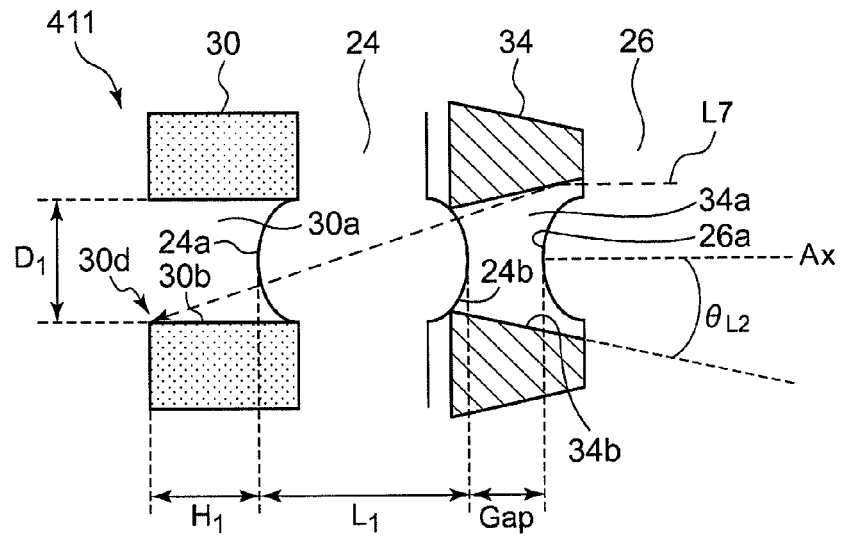
FIG. 8 shows a lower limit value of angle of inclination of the interior wall surface of the intermediate through hole necessary for elimination of flare noise.

FIG. 8 shows a lower limit value $\theta_{L2}$ of angle of inclination θ of the interior wall surface 34b of the intermediate through hole 34a necessary for elimination of flare noise. A beam L7 reflected in the vicinity of the edge of the interior wall surface 34b of the intermediate through hole 34a toward the third surface and traveling diagonally in the first lens array plate 24 will be considered in order to determine the lower limit value $\theta_{L2}$. The interior wall surface 34b of the intermediate through hole 34a is inclined with respect to the optical axis Ax so that the beam L7 impinges on the interior wall surface 30b at the open end edge 30d of the first surface through hole 30a facing the object plane. When the interior wall surface 34b is inclined as described above, there are no paths in which the beam is reflected by the interior wall surface 34b of the intermediate through hole 34a and reaches the linear image sensor. The angle of inclination $\theta_{L2}$ of the interior wall surface 34b of the intermediate through hole 34a occurring in this state represents the lower limit value of the angle of inclination necessary for elimination of flare noise. The angle of inclination $\theta_{L2}$ is given by the following expression (6).

$$\theta_{L2} \approx \tan^{-1}(D1/(Gap+L1+H1))/2 \quad (6)$$

where Gap denotes a gap between the first lens array plate 24 and the second lens array plate 26, L1 denotes a thickness of the first lens array plate 24, H1 denotes a height of the first surface light-shielding wall 30, and D1 denotes the diameter of the opening of the first surface through hole 30a facing the object plane. Therefore, the angle of inclination θ of the interior wall surface 34b of the intermediate through hole 34a should meet the following expression (7).

$$\theta \geq \tan^{-1}(D1/(Gap+L1+H1))/2 \quad (7)$$

Figure 9:
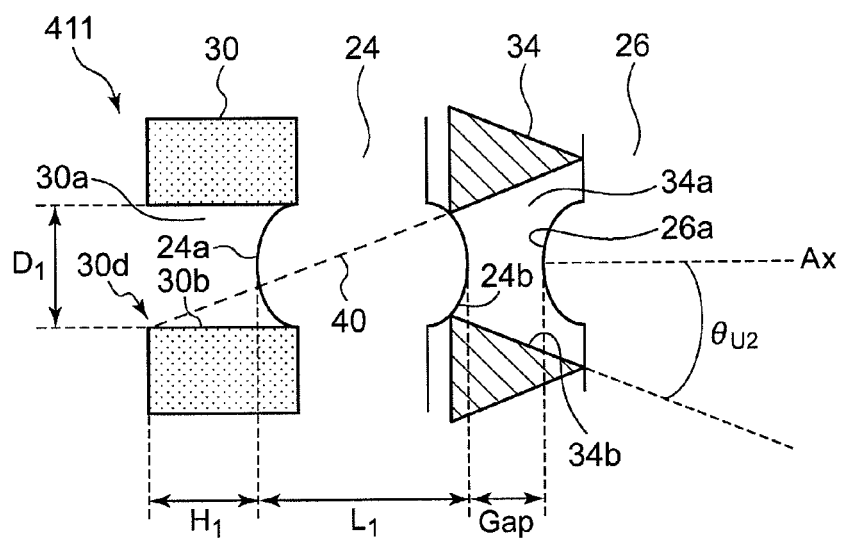
FIG. 9 shows an upper limit value of the angle of inclination of the interior wall surface of the intermediate through hole.

FIG. 9 shows an upper limit value θU2 of the angle of inclination θ of the interior wall surface 34b of the intermediate through hole 34a. As in FIG. 6, a line 40 extended from the interior wall surface 34b of the intermediate through hole 34a is assumed to touch the interior wall surface 30b at the open end edge 30d of the first surface through hole 30a facing the object plane. When this condition holds, no beams reach the intermediate light-shielding wall 34 without impinging on the first surface light-shielding wall 30. The angle of inclination θU2 of the interior wall surface 34b that meets the above condition can be considered to be the upper limit angle beyond which flare noise cannot be eliminated any further even if the angle of inclination θ is increased. The angle of inclination θU2 is given by the following expression (8).

$$\theta U2 \approx \tan^{-1}((P+D1)/2/(Gap+L1+H1)) \quad (8)$$

where P denotes the interval of arrangement of the first through fourth lenses. Therefore, it is desired that the angle of inclination θ of the interior wall surface 34b of the intermediate through hole 34a meet the following expression (9).

$$\theta \leq \tan^{-1}((P+D1)/2/(Gap+L1+H1)) \quad (9)$$

Taking the expression (7) and (9) together, it is desired that the angle of inclination θ of the interior wall surface 34b of the intermediate through hole 34a meet the following expression (10).

$$\tan^{-1}(D1/(Gap+L1+H1))/2 \leq \theta \leq \tan^{-1}((P+D1)/2/(Gap+L1+H1)) \quad (10)$$

In this embodiment, the fourth surface light-shielding wall 32 is a light-shielding member of a film form. Alternatively, the fourth surface light-shielding wall 32 may be a light-shielding member of a plate form. In this case, ghost noise is further reduced.

In this embodiment, the first surface through hole 30a is cylindrically formed. Alternatively, the first surface through hole 30a may be formed as a circular truncated cone. In other words, the diameter of the opening of the first surface through hole 30a facing the object plane and that of the opening at the first surface may be different. Similarly, if the fourth surface light-shielding wall 32 is a light-shielding member of a plate form, the fourth surface through hole 32a may be cylindrically formed or formed as a circular truncated cone.

In the erecting equal-magnification lens array plate 11 shown in FIG. 2 and the erecting equal-magnification lens array plate 411 shown in FIG. 7, the intermediate light-shielding wall 34 is in contact with the second surface 24d of the first lens array plate 24 and the third surface 26c of the second lens array plate 26. In other words, the gap between the first lens array plate 24 and the second lens array plate 26 is defined by the intermediate light-shielding wall 34. However, the gap between the lens array plates need not be defined by the intermediate light-shielding wall 34. For example, the gap may be defined by another member so that a gap may be created between the lens array plate(s) and the intermediate light-shielding wall 34. More specifically, a gap may be created between the intermediate light-shielding wall 34 and one or both of the second surface 24d and the third surface 26c. This is advantageous in that the gap between the lens array plates is not affected by the dimension accuracy of the height of the intermediate light-shielding wall 34. An added advantage in this case is that the gap helps reduce the height of the intermediate light-shielding wall 34 so that the angle of inclination of the interior wall surface 34b of the intermediate through hole 34a can be increased.

Figure 10:
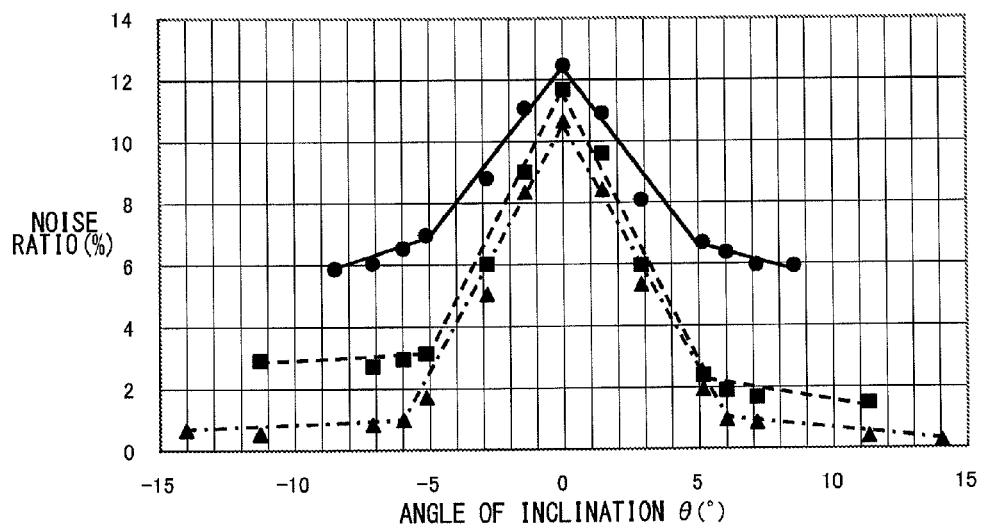
FIG. 10 shows a result of simulation of the erecting equal-magnification lens array plate according to an embodiment of the present invention.

FIG. 10 shows a result of simulation conducted in the erecting equal-magnification lens array plate according to an exemplary embodiment of the present invention. FIG. 10 shows how the noise ratio varies as the angle of inclination θ of the interior wall surface of the intermediate through hole is varied when the pitch of arrangement of the first through fourth lenses (hereinafter, lens arrangement pitch) is 0.7 mm, when the pitch is 0.8 mm, and when the pitch is 0.9 mm, respectively. Referring to FIG. 10, the solid line indicates the result of simulation occurring when the lens arrangement pitch=0.7 mm, the broken line indicates the result of simulation occurring when the lens arrangement pitch=0.8 mm, and the chain line indicates the result of simulation occurring when the lens arrangement pitch=0.9 mm. In FIG. 10, the angle of inclination θ occurring when the diameter of the opening of the intermediate through hole at the second surface is larger than the diameter of the opening at the third surface is defined to be "positive", and the angle of inclination θ occurring when the diameter of the opening of the intermediate through hole at the third surface is larger than the diameter of the opening at the second surface is defined to be "negative".

The other conditions for simulation are such that the conjugation length TC=9.9 mm, the lens diameter of the first through fourth surfaces (hereinafter lens diameter)=0.6 mm, the gap between the first lens array plate and the second lens array plate (hereinafter, gap)=1.0 mm, the thickness of the first and second lens array plates (hereinafter, lens thickness) =1.15 mm, the diameter of the opening of the first surface light-shielding wall facing the object plane=0.5 mm, the diameter of the opening of the first surface light-shielding wall at the first surface=0.55 mm, the height of the first surface light-shielding wall=0.5 mm, the diameter of the opening of the fourth surface light-shielding wall facing the image plane=0.5 mm, the diameter of the fourth surface light-shielding wall at the fourth surface=0.55 mm, and the height of the fourth surface light-shielding wall=0.5 mm. A ray tracing simulation was conducted. The entirety of the erecting equal-magnification lens array plate is illuminated in the main scanning direction by a 90° Lambertian emission from a point light source. The amount of imaging light arriving at a specified point on the image plane is designated as the amount of imaging light transmitted. The amount of light arriving elsewhere is designated as the amount of light transmitted as noise. The illumination and calculation of the amount of light are conducted on a line extending in the main scanning direction. A noise ratio is defined as a sum of the amount of light transmitted as noise divided by the amount of imaging light transmitted.

As shown in FIG. 10, given the lens arrangement pitch=0.7 mm, the rate of variation of noise ratio changes at a folding point as the angle of inclination $\theta$ is increased from 0°. The change occurs when the angle of inclination≈±5° both in the positive and negative side. At angles of inclination larger than the angle at the folding point in absolute value, the noise ratio is suppressed at a low level. FIG. 10 also reveals that, given the lens arrangement pitch=0.8 mm, the folding point occurs when the angle of inclination≈±5°, and the noise ratio is suppressed at a low level at angles of inclination larger than the angle at the folding point in absolute value. FIG. 10 also reveals that, given the lens arrangement pitch=0.9 mm, the folding point occurs when the angle of inclination±6°, and the noise ratio is suppressed at a low level at angles of inclination larger than the angle at the folding point in absolute value. Substituting the conditions of this simulation into the expressions (1) and (6), $\theta_{L1}=\theta_{L2}=5.3°$. Since $\theta_{L1}$ and $\theta_{L2}$ are lower limit values of the angle of inclination necessary for elimination of flare noise, the result of this simulation generally matches the theory described above in the embodiment. As discussed above, the noise ratio can be reduced by adjusting the angle of inclination of the interior wall surface of the intermediate through hole to adapt to the change in the lens arrangement pitch.

Figure 11:
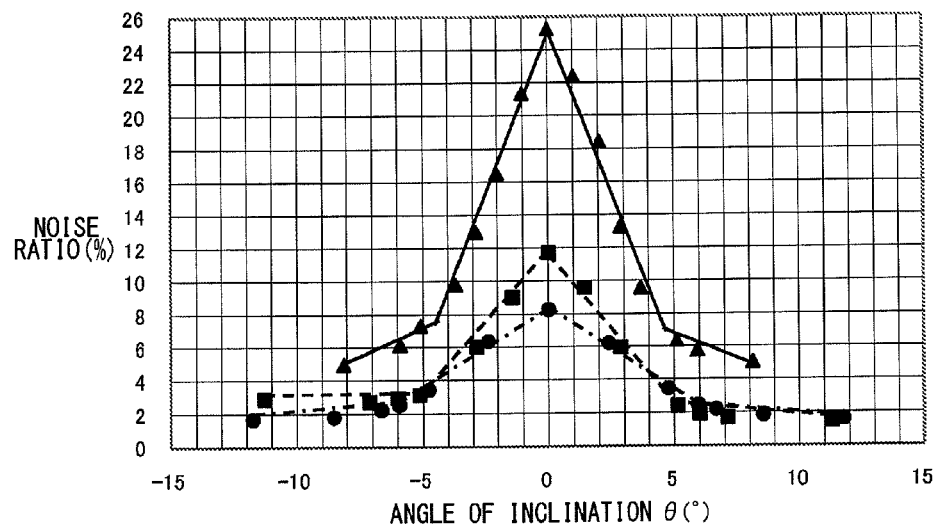
FIG. 11 shows a result of simulation of the erecting equal-magnification lens array plate according to another embodiment of the present invention.

FIG. 11 shows a result of simulation conducted in the erecting equal-magnification lens array plate according to another exemplary embodiment of the present invention. FIG. 11 shows how the noise ratio varies as the angle of inclination $\theta$ of the interior wall surface of the intermediate through hole is varied when the gap is 0.6 mm, 1.0 mm, and 1.4 mm. Referring to FIG. 11, the chain line indicates the result of simulation occurring when the gap=0.6 mm, the broken line indicates the result of simulation occurring when the gap=1.0 mm, and the solid line indicates the result of simulation occurring when the gap=1.4 mm. The other conditions for simulation are such that the conjugation length TC=9.9 mm, the lens arrangement pitch=0.8 mm, the lens diameter=0.6 mm, the diameter of the opening of the first surface light-shielding wall facing the object plane=0.5 mm, the diameter of the opening of the first surface light-shielding wall at the first surface=0.55 mm, the height of the first surface light-shielding wall=0.5 mm, the diameter of the opening of the fourth surface light-shielding wall facing the image plane=0.5 mm, the diameter of the opening of the fourth surface light-shielding wall at the fourth surface=0.55 mm, and the height of the fourth surface light-shielding wall=0.5 mm. Further, the lens thickness=1.35 mm when the gap=0.6 mm, the lens thickness=1.15 mm when the gap=1.0 mm, and the lens thickness=0.95 mm when the gap=1.4 mm.

As shown in FIG. 11, given that the gap=0.6 mm and the angle of inclination $\theta$ is increased from 0°, the noise ratio is suppressed at a low level at angles of inclination larger than the angle at the folding point in absolute value which occurs when the angle of inclination≈±6°. FIG. 11 also reveals that, given the gap=1.0 mm, the folding point occurs when the angle of inclination≈±5°, and the noise ratio is suppressed at a low level at angles of inclination larger than the angle at the folding point in absolute value. FIG. 11 also reveals that, given the gap=1.4 mm, the folding point occurs when the angle of inclination±4.5°, and the noise ratio is suppressed at a low level at angles of inclination larger than the angle at the folding point in absolute value. Substituting the conditions of this simulation into the expressions (1) and (6), $\theta_{L1}=\theta_{L2}=5.8°$ when the gap=0.6 mm, $\theta_{L1}=\theta_{L2}=5.3°$ when the gap=1.0 mm, and $\theta_{L1}=\theta_{L2}=5.0°$ when the gap=1.4 mm. Therefore, the result of this simulation generally matches the theory described above in the embodiment. As discussed above, the noise ratio can be reduced by adjusting the angle of inclination of the interior wall surface of the intermediate through hole to adapt to the change in the gap.

Figure 12:
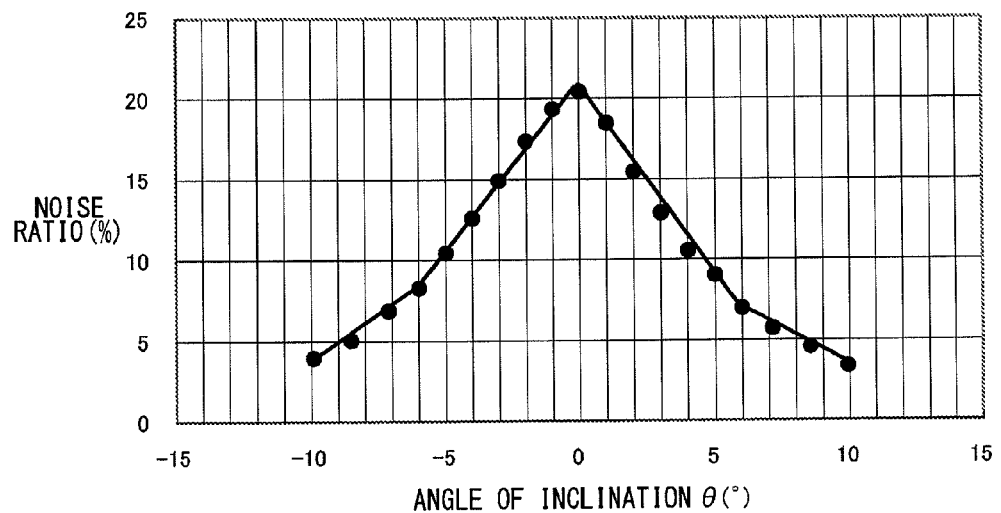
FIG. 12 shows a result of simulation of the erecting equal-magnification lens array plate according to still another embodiment of the present invention.

FIG. 12 shows a result of simulation conducted in the erecting equal-magnification lens array plate according to yet another exemplary embodiment of the present invention. FIG. 12 shows how the noise ratio varies as the angle of inclination $\theta$ of the interior wall surface of the intermediate through hole is varied when the height of the first surface light-shielding wall=the height of the fourth surface light-shielding wall=0.1 mm. The other conditions for simulation are such that the conjugation length TC=9.9 mm, the lens arrangement pitch=0.8 mm, the lens diameter=0.6 mm, the gap=1.0 mm, the lens thickness=1.15 mm, the diameter of the opening of the first surface light-shielding wall facing the object plane=0.5 mm, the diameter of the opening of the first surface light-shielding wall at the first surface=0.55 mm, the diameter of the opening of the fourth surface light-shielding wall facing the image plane=0.5 mm, and the diameter of the opening of the fourth surface light-shielding wall at the fourth surface=0.55 mm.

As shown in FIG. 12, as the angle of inclination $\theta$ is increased from 0°, the noise ratio is suppressed at a low level at angles of inclination larger than the angle at the folding point in absolute value which occurs when the angle of inclination≈±6°. Substituting the conditions of this simulation into the expressions (1) and (6), $\theta_{L1}=\theta_{L2}=6.3°$. Therefore, the result of this simulation generally matches the theory described above in the embodiment. As discussed above, the noise ratio can be reduced by adjusting the angle of inclination of the interior wall surface of the intermediate through hole to adapt to the change in the height of the first surface light-shielding wall and the fourth surface light-shielding wall.

Figure 13:
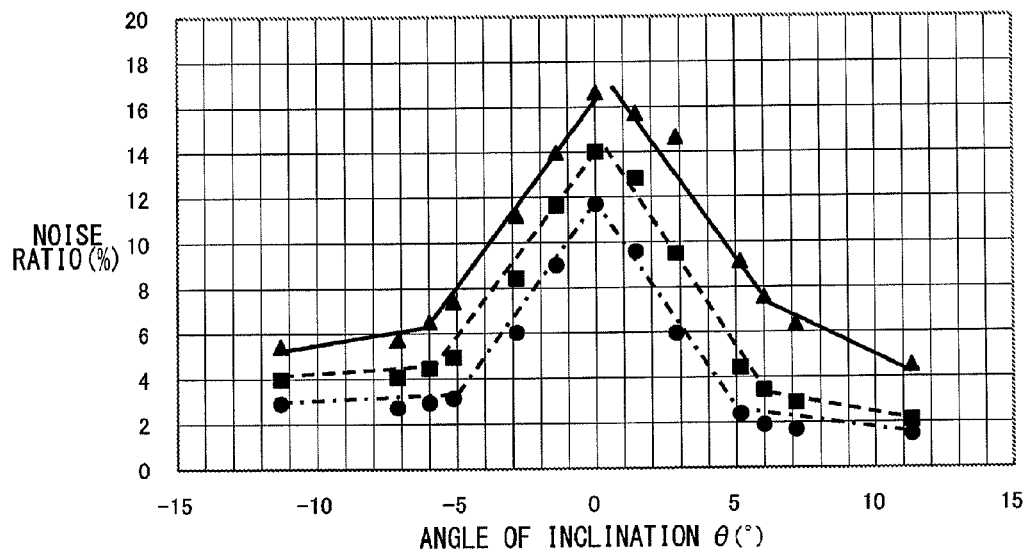
FIG. 13 shows a result of simulation of the erecting equal-magnification lens array plate according to still another embodiment of the present invention.

FIG. 13 shows a result of simulation conducted in the erecting equal-magnification lens array plate according to still another exemplary embodiment of the present invention. FIG. 13 shows how the noise ratio varies as the angle of inclination $\theta$ of the interior wall surface of the intermediate through hole is varied when the diameter of the opening of first surface light-shielding wall facing the object plane=the diameter of the opening of the fourth surface light-shielding wall facing the image plane=0.5 mm, when the diameter of the opening of first surface light-shielding wall facing the object plane=the diameter of the opening of the fourth surface light-shielding wall facing the image plane=0.55 mm, and when the diameter of the opening of first surface light-shielding wall facing the object plane=the diameter of the opening of the fourth surface light-shielding wall facing the image plane=0.6 mm, respectively. Referring to FIG. 13, the chain line indicates the result of simulation occurring when the diameter of the opening of first surface light-shielding wall facing the object plane=the diameter of the opening of the fourth surface light-shielding wall facing the image plane=0.5 mm, the broken line indicates the result of simulation occurring when the diameter of the opening of first surface light-shielding wall facing the object plane=the diameter of the opening of the fourth surface light-shielding wall facing the image plane=0.55 mm, and the solid line indicates the result of simulation occurring when the diameter of the opening of first surface light-shielding wall facing the object plane=the diameter of the opening of the fourth surface light-shielding wall facing the image plane=0.6 mm. The other conditions for simulation are such that the conjugation length TC=9.9 mm, the lens arrangement pitch=0.8 mm, the lens diameter=0.6 mm, the gap=1.0 mm, the lens thickness=1.15 mm, the diameter of the opening of the first surface light-shielding wall at the first surface=0.55 mm, the height of the first surface light-shielding wall=0.5 mm, the diameter of the opening of the fourth surface light-shielding wall at the fourth surface=0.55 mm, and the height of the fourth surface light-shielding wall=0.5 mm.

As shown in FIG. 13, given that the diameter of the opening of first surface light-shielding wall facing the object plane=the diameter of the opening of the fourth surface light-shielding wall facing the image plane=0.5 mm and the angle of inclination θ is increased from 0°, the noise ratio is suppressed at a low level at angles of inclination larger than the angle at the folding point in absolute value which occurs when the angle of inclination≈±5°. FIG. 13 also reveals that, given the diameter of the opening of first surface light-shielding wall facing the object plane=the diameter of the opening of the fourth surface light-shielding wall facing the image plane=0.55 mm, the folding point occurs when the angle of inclination≈±6°, and the noise ratio is suppressed at a low level at angles of inclination larger than the angle at the folding point in absolute value. FIG. 13 also reveals that, given the diameter of the opening of first surface light-shielding wall facing the object plane=the diameter of the opening of the fourth surface light-shielding wall facing the image plane=0.6 mm, the folding point occurs when the angle of inclination≈±6°, and the noise ratio is suppressed at a low level at angles of inclination larger than the angle at the folding point in absolute value. Substituting the conditions of this simulation into the expressions (1) and (6), $\theta_{L1}=\theta_{L2}=5.3°$ when the diameter of the opening of first surface light-shielding wall facing the object plane=the diameter of the opening of the fourth surface light-shielding wall facing the image plane=0.5 mm, $\theta_{L1}=\theta_{L2}=5.9°$ when the diameter of the opening of first surface light-shielding wall facing the object plane=the diameter of the opening of the fourth surface light-shielding wall facing the image plane=0.55 mm, and $\theta_{L1}\theta_{L2}=6.4°$ when the diameter of the opening of first surface light-shielding wall facing the object plane=the diameter of the opening of the fourth surface light-shielding wall facing the image plane=0.6 mm. Therefore, the result of this simulation generally matches the theory described above in the embodiment. As discussed above, the noise ratio can be reduced by adjusting the angle of inclination of the interior wall surface of the intermediate through hole to adapt to the change in the diameter of the opening of first surface light-shielding wall facing the object plane and the diameter of the opening of the fourth surface light-shielding wall facing the image plane.

Figure 14:
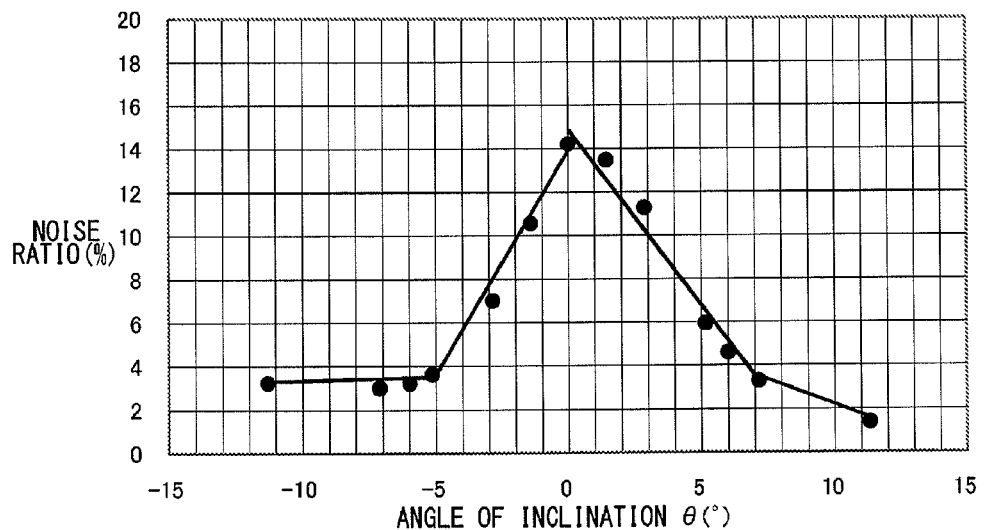
FIG. 14 shows a result of simulation of the erecting equal-magnification lens array plate according to yet another embodiment of the present invention.

FIG. 14 shows a result of simulation conducted in the erecting equal-magnification lens array plate according to yet another exemplary embodiment of the present invention. FIG. 14 shows how the noise ratio varies as the angle of inclination θ of the interior wall surface of the intermediate through hole is varied when the height of the first surface light-shielding wall=0.5 mm and the height of the fourth surface light-shielding wall=0.1 mm. The other conditions for simulation are such that the conjugation length TC=9.9 mm, the lens arrangement pitch=0.8 mm, the lens diameter=0.6 mm, the gap=1.0 mm, the lens thickness=1.15 mm, the diameter of the opening of the first surface light-shielding wall facing the object plane=0.5 mm, the diameter of the opening of the first surface light-shielding wall at the first surface=0.55 mm, the diameter of the opening of the fourth surface light-shielding wall facing the image plane=0.5 mm, and the diameter of the opening of the fourth surface light-shielding wall at the fourth surface=0.55 mm.

As shown in FIG. 14, as the angle of inclination θ is increased from 0°, the noise ratio is suppressed at a low level at angles of inclination larger than the angle at the folding point in absolute value which occurs when the angle of inclination≈+7° on the positive side. FIG. 14 also shows that the noise ratio is suppressed at a low level at angles of inclination larger than the angle at the folding point in absolute value which occurs when the angle of inclination≈−5° on the negative side. Substituting the conditions of this simulation into the expression (1), $\theta_{L1}=6.3°$, and substituting the conditions into (6), $\theta_{L2}=5.3°$. Therefore, the result of this simulation generally matches the theory described above in the embodiment.

Figure 15:
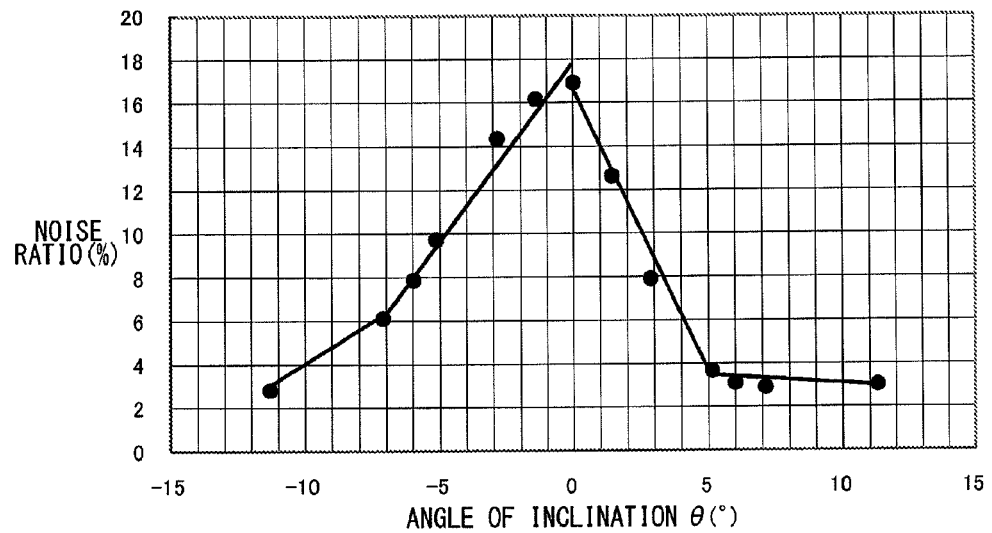
FIG. 15 shows a result of simulation of the erecting equal-magnification lens array plate according to still another embodiment of the present invention.

FIG. 15 shows a result of simulation conducted in the erecting equal-magnification lens array plate according to still another exemplary embodiment of the present invention. FIG. 15 shows how the noise ratio varies as the angle of inclination θ of the interior wall surface of the intermediate through hole is varied when the height of the first surface light-shielding wall=0.1 mm and the height of the fourth surface light-shielding wall=0.5 mm. The other conditions for simulation are such that the conjugation length TC=9.9 mm, the lens arrangement pitch=0.8 mm, the lens diameter=0.6 mm, the gap=1.0 mm, the lens thickness=1.15 mm, the diameter of the opening of the first surface light-shielding wall facing the object plane=0.5 mm, the diameter of the opening of the first surface light-shielding wall at the first surface=0.55 mm, the diameter of the opening of the fourth surface light-shielding wall facing the image plane=0.5 mm, and the diameter of the opening of the fourth surface light-shielding wall at the fourth surface=0.55 mm.

As shown in FIG. 15, as the angle of inclination θ is increased from 0°, the noise ratio is suppressed at a low level at angles of inclination larger than the angle at the folding point in absolute value which occurs when the angle of inclination≈+5° on the positive side. FIG. 15 also shows that the noise ratio is suppressed at a low level at angles of inclination larger than the angle at the folding point in absolute value which occurs when the angle of inclination≈−7° on the negative side. Substituting the conditions of this simulation into the expression (1), $\theta_{L1}=5.3°$, and substituting the conditions into (6), $\theta_{L2}=6.3°$. Therefore, the result of this simulation generally matches the theory described above in the embodiment.

As shown in FIGS. 14 and 15, the noise ratio can be reduced by adjusting the angle of inclination of the interior wall surface of the intermediate through hole to adapt to the change in the height of the first surface light-shielding wall and the fourth surface light-shielding wall.

Figure 16:
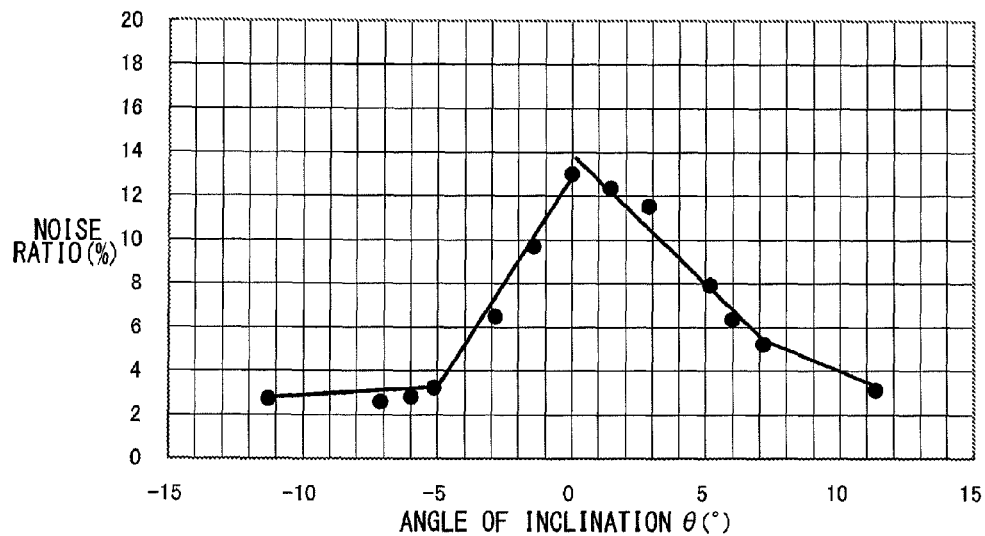
FIG. 16 shows a result of simulation of the erecting equal-magnification lens array plate according to yet another embodiment of the present invention.

FIG. 16 shows a result of simulation conducted in the erecting equal-magnification lens array plate according to yet another exemplary embodiment of the present invention. FIG. 16 shows how the noise ratio varies as the angle of inclination θ of the interior wall surface of the intermediate through hole is varied when the diameter of the opening of first surface light-shielding wall facing the object plane=0.5 mm, the diameter of the opening of the first surface light-shielding wall at the first surface=0.55 mm, the diameter of the opening of the fourth surface light-shielding wall facing the image plane=0.6 mm, and the diameter of the opening of fourth surface light-shielding wall at the fourth surface=0.55 mm. The other conditions for simulation are such that the conjugation length TC=9.9 mm, the lens arrangement pitch=0.8 mm, the lens diameter=0.6 mm, the gap=1.0 mm, the lens thickness=1.15 mm, the height of the first surface light-shielding wall=0.5 mm, and the height of the fourth surface light-shielding wall=0.5 mm.

As shown in FIG. 16, as the angle of inclination θ is increased from 0°, the noise ratio is suppressed at a low level at angles of inclination larger than the angle at the folding point in absolute value which occurs when the angle of inclination≈+7° on the positive side. FIG. 16 also shows that the noise ratio is suppressed at a low level at angles of inclination larger than the angle at the folding point in absolute value which occurs when the angle of inclination≈−5° on the negative side. Substituting the conditions of this simulation into the expression (1), $\theta_{L1}$=6.4°, and substituting the conditions into (6), $\theta_{L2}$=5.3°. Therefore, the result of this simulation generally matches the theory described above in the embodiment.

Figure 17:
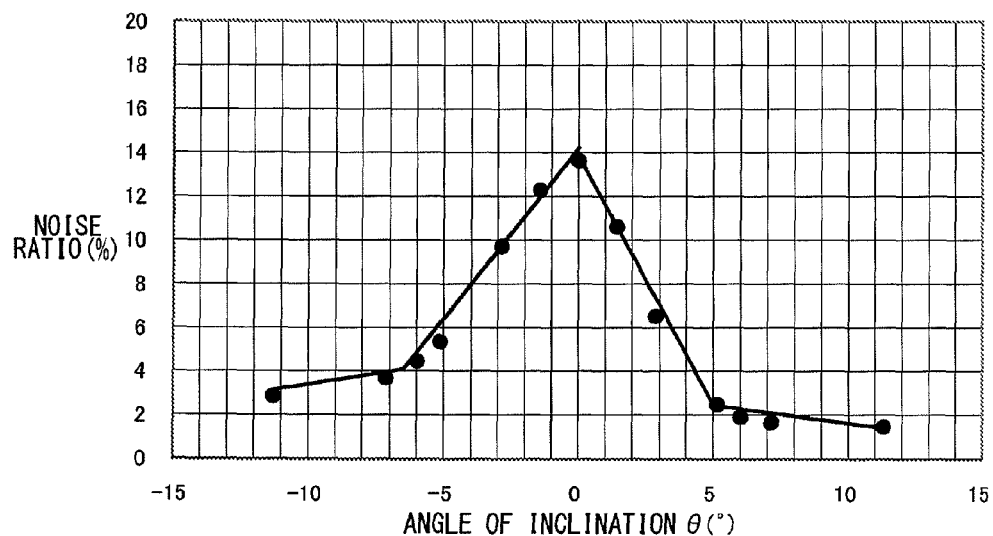
FIG. 17 shows a result of simulation of the erecting equal-magnification lens array plate according to still another embodiment of the present invention.

FIG. 17 shows a result of simulation conducted in the erecting equal-magnification lens array plate according to still another exemplary embodiment of the present invention. FIG. 17 shows how the noise ratio varies as the angle of inclination θ of the interior wall surface of the intermediate through hole is varied when the diameter of the opening of first surface light-shielding wall facing the object plane=0.6 mm, the diameter of the opening of the first surface light-shielding wall at the first surface=0.55 mm, the diameter of the opening of the fourth surface light-shielding wall facing the image plane=0.5 mm, and the diameter of the opening of fourth surface light-shielding wall at the fourth surface=0.55 mm. The other conditions for simulation are such that the conjugation length TC=9.9 mm, the lens arrangement pitch=0.8 mm, the lens diameter=0.6 mm, the gap=1.0 mm, the lens thickness=1.15 mm, the height of the first surface light-shielding wall=0.5 mm, and the height of the fourth surface light-shielding wall=0.5 mm.

As shown in FIG. 17, as the angle of inclination θ is increased from 0°, the noise ratio is suppressed at a low level at angles of inclination larger than the angle at the folding point in absolute value which occurs when the angle of inclination≈+5° on the positive side. FIG. 17 also shows that the noise ratio is suppressed at a low level at angles of inclination larger than the angle at the folding point in absolute value which occurs when the angle of inclination≈−6.5° on the negative side. Substituting the conditions of this simulation into the expression (1), $\theta_{L1}$=5.3°, and substituting the conditions into (6), $\theta_{L2}$=6.4°. Therefore, the result of this simulation generally matches the theory described above in the embodiment.

As shown in FIGS. 16 and 17, the noise ratio can be reduced by adjusting the angle of inclination of the interior wall surface of the intermediate through hole even when the shapes of the first surface light-shielding wall and the fourth surface light-shielding wall are different.

Figure 18:
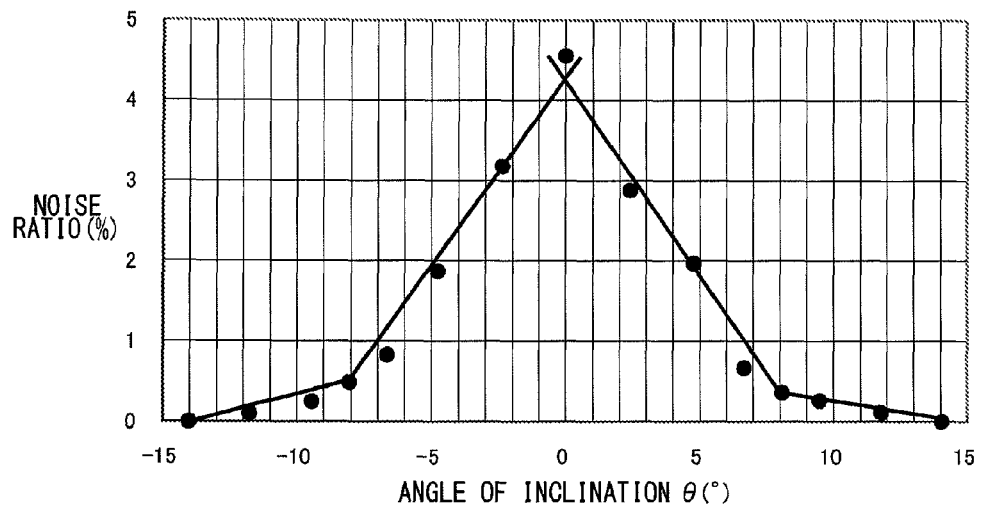
FIG. 18 shows a result of simulation of the erecting equal-magnification lens array plate according to yet another embodiment of the present invention.

FIG. 18 shows a result of simulation conducted in the erecting equal-magnification lens array plate according to still another exemplary embodiment of the present invention. FIG. 18 shows how the noise ratio varies as the angle of inclination θ of the interior wall surface of the intermediate through hole is varied when the conjugation length TC=14.0 mm, the lens arrangement pitch=0.9 mm, the lens diameter=0.7 mm, the gap=0.6 mm, the lens thickness=0.8 mm, the diameter of the opening of the first surface light-shielding wall facing the object plane=0.6 mm, the diameter of the opening of the first surface light-shielding wall at the first surface=0.65 mm, the height of the first surface light-shielding wall=0.5 mm, the diameter of the opening of the fourth surface light-shielding wall facing the image plane=0.6 mm, the diameter of the opening of the fourth surface light-shielding wall at the fourth surface=0.65 mm, and the height of the fourth surface light-shielding wall=0.5 mm.

As shown in FIG. 18, as the angle of inclination θ is increased from 0°, the noise ratio is suppressed at a low level at angles of inclination larger than the angle at the folding point in absolute value which occurs when the angle of inclination≈±8°. Substituting the conditions of this simulation into the expressions (1) and (6), $\theta_{L1}$=$\theta_{L2}$=8.8°. Therefore, the result of this simulation generally matches the theory described above in the embodiment.

Figure 19:
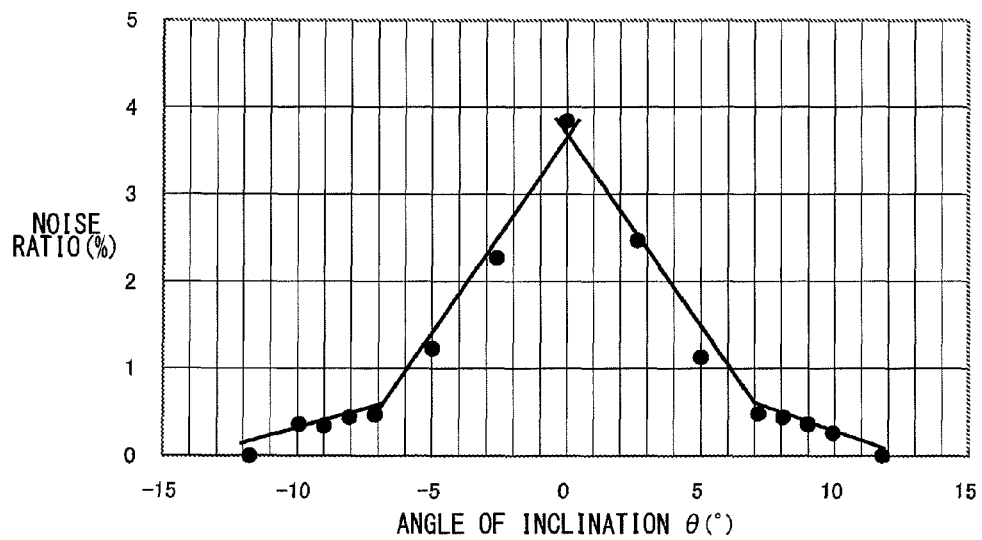
FIG. 19 shows a result of simulation of the erecting equal-magnification lens array plate according to still another embodiment of the present invention.

FIG. 19 shows a result of simulation conducted in the erecting equal-magnification lens array plate according to yet another exemplary embodiment of the present invention. FIG. 19 shows how the noise ratio varies as the angle of inclination θ of the interior wall surface of the intermediate through hole is varied when the conjugation length TC=14.0 mm, the lens arrangement pitch=0.75 mm, the lens diameter=0.6 mm, the gap=0.6 mm, the lens thickness=0.8 mm, the diameter of the opening of the first surface light-shielding wall facing the object plane=0.5 mm, the diameter of the opening of the first surface light-shielding wall at the first surface=0.55 mm, the height of the first surface light-shielding wall=0.5 mm, the diameter of the opening of the fourth surface light-shielding wall facing the image plane=0.5 mm, the diameter of the opening of the fourth surface light-shielding wall at the fourth surface=0.55 mm, and the height of the fourth surface light-shielding wall=0.5 mm.

As shown in FIG. 19, as the angle of inclination θ is increased from 0°, the noise ratio is suppressed at a low level at angles of inclination larger than the angle at the folding point in absolute value which occurs when the angle of inclination≈±7°. Substituting the conditions of this simulation into the expressions (1) and (6), $\theta_{L1}$=$\theta_{L2}$=7.4°. Therefore, the result of this simulation generally matches the theory described above in the embodiment.

Figure 20:
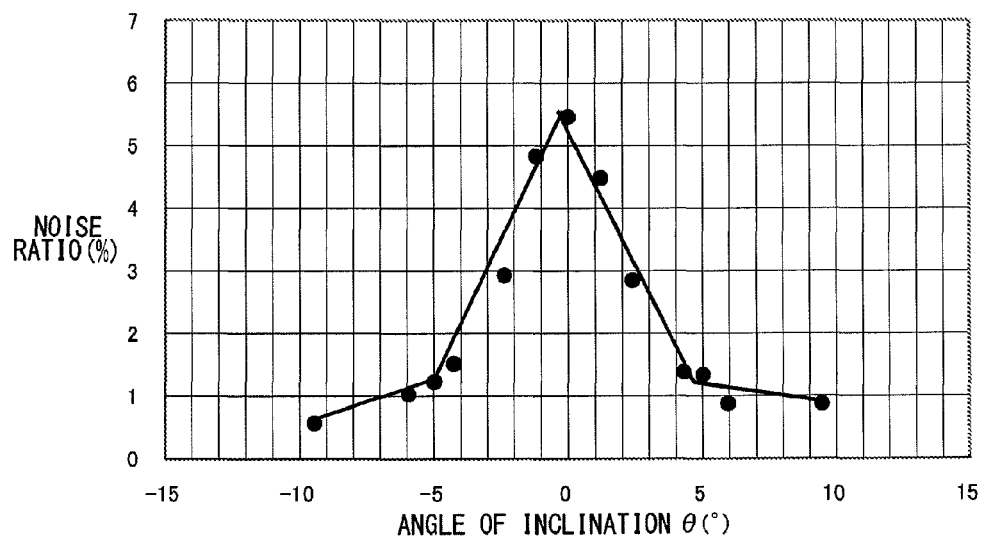
FIG. 20 shows a result of simulation of the erecting equal-magnification lens array plate according to yet another embodiment of the present invention.

FIG. 20 shows a result of simulation conducted in the erecting equal-magnification lens array plate according to still another exemplary embodiment of the present invention. FIG. 20 shows how the noise ratio varies as the angle of inclination θ of the interior wall surface of the intermediate through hole is varied when the conjugation length TC=14.0 mm, the lens arrangement pitch=0.5 mm, the lens diameter=0.35 mm, the gap=0.6 mm, the lens thickness=0.8 mm, the diameter of the opening of the first surface light-shielding wall facing the object plane=0.3 mm, the diameter of the opening of the first surface light-shielding wall at the first surface=0.32 mm, the height of the first surface light-shielding wall=0.5 mm, the diameter of the opening of the fourth surface light-shielding wall facing the image plane=0.3 mm, the diameter of the opening of the fourth surface light-shielding wall at the fourth surface=0.32 mm, and the height of the fourth surface light-shielding wall=0.5 mm.

As shown in FIG. 20, as the angle of inclination θ is increased from 0°, the noise ratio is suppressed at a low level at angles of inclination larger than the angle at the folding points in absolute value which occur when the angle of inclination≈+4.5° on the positive side and at the angle of inclination≈−5° on the negative side. Substituting the conditions of this simulation into the expressions (1) and (6), $\theta_{L1}\theta_{L2}$=4.5°. Therefore, the result of this simulation generally matches the theory described above in the embodiment.

As shown in FIGS. 18-20, the noise ratio can be reduced by adjusting the angle of inclination of the interior wall surface of the intermediate through hole to adapt to the change in the design of the lens optics.

Figure 21:
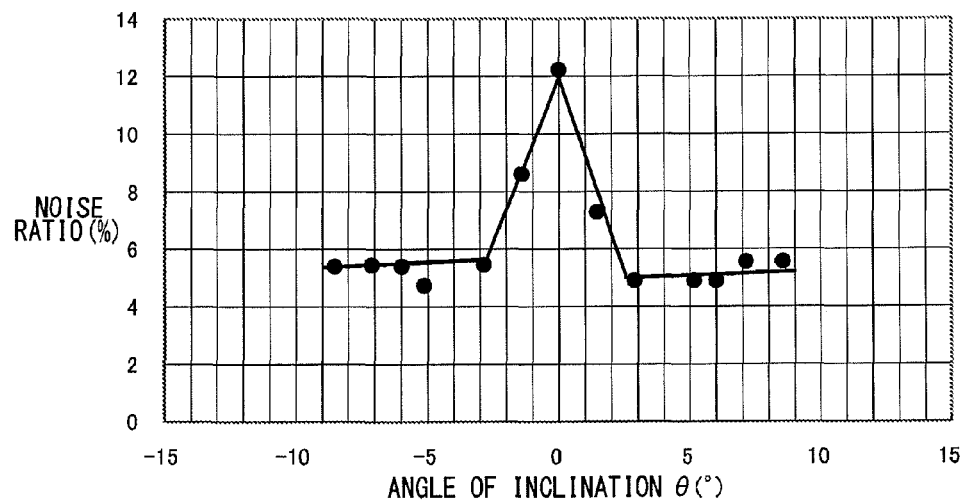
FIG. 21 shows a result of simulation of the erecting equal-magnification lens array plate according to still another embodiment of the present invention.

FIG. 21 shows a result of simulation conducted in the erecting equal-magnification lens array plate according to yet another exemplary embodiment of the present invention. FIG. 21 shows how the noise ratio varies as the angle of inclination θ of the interior wall surface of the intermediate through hole is varied when the conjugation length TC=18.0 mm, the lens arrangement pitch=0.5 mm, the lens diameter=0.35 mm, the gap=0.5 mm, the lens thickness=2.15 mm, the diameter of the opening of the first surface light-shielding wall facing the object plane=0.3 mm, the diameter of the opening of the first surface light-shielding wall at the first surface=0.32 mm, the height of the first surface light-shielding wall=1.0 mm, the diameter of the opening of the fourth surface light-shielding wall facing the image plane=0.3 mm, the diameter of the opening of the fourth surface light-shielding wall at the fourth surface=0.32 mm, and the height of the fourth surface light-shielding wall=1.0 mm.

As shown in FIG. 21, as the angle of inclination θ is increased from 0°, the noise ratio is suppressed at a low level at angles of inclination larger than the angle at the folding points in absolute value which occur when the angle of inclination≈+2.5° on the positive side and at the angle of inclination≈−3° on the negative side. Substituting the conditions of this simulation into the expressions (1) and (6), $\theta_{L1}=\theta_{L2}$=2.3°. Therefore, the result of this simulation generally matches the theory described above in the embodiment. As discussed above, the noise ratio can be reduced by adjusting the angle of inclination of the interior wall surface of the intermediate through hole to adapt to the change in the design of the lens optics.

Figure 22:
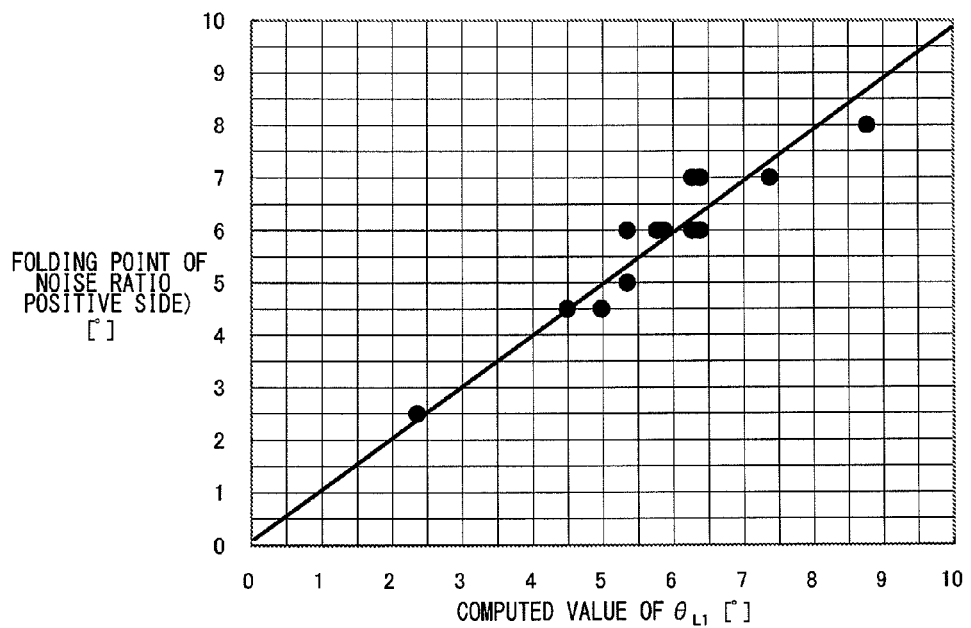
FIG. 22 shows the correlation between the lower limit value of the angle of inclination of the interior wall surface of the intermediate through hole and the folding point of the noise ratio (positive side)
Figure 23:
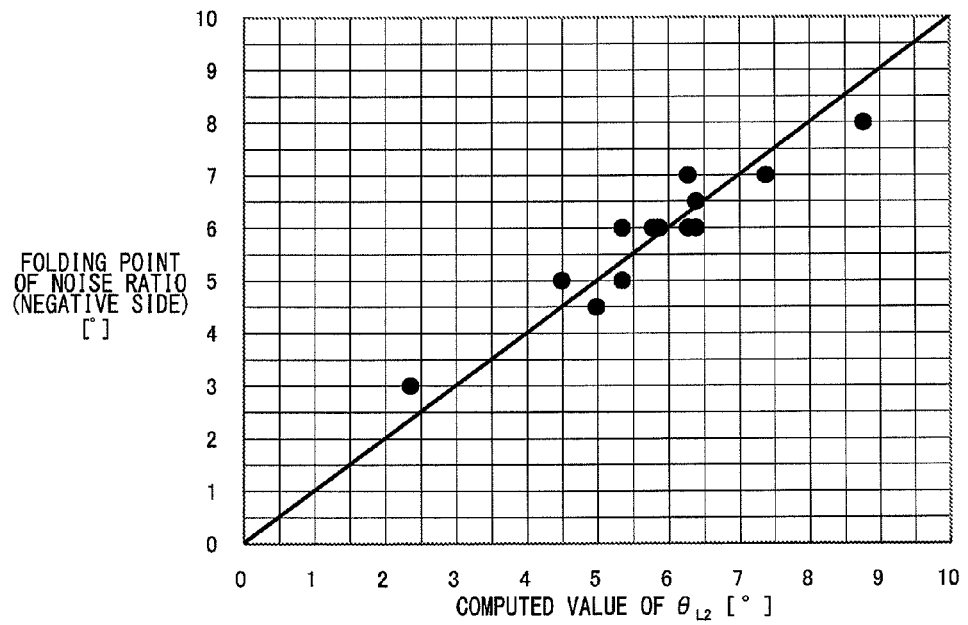
FIG. 23 shows the correlation between the lower limit value of the angle of inclination of the interior wall surface of the intermediate through hole and the folding point of the noise ratio (negative side)

FIG. 22 shows the correlation between the lower limit value $\theta_{L1}$ of the angle of inclination of the interior wall surface of the intermediate through hole and the folding point of the noise ratio (positive side). FIG. 23 shows the correlation between the lower limit value $\theta_{L2}$ of the angle of inclination of the interior wall surface of the intermediate through hole and the folding point of the noise ratio (negative side). FIGS. 22 and 23 summarize the results of simulation in FIGS. 10-21. FIGS. 22 and 23 reveal that the lower limit values $\theta_{L1}$ and $\theta_{L2}$ of the angle of inclination computed from the expressions (1) and (6) are highly correlated with the folding point of the noise ratio determined from the simulation.

Figure 24:
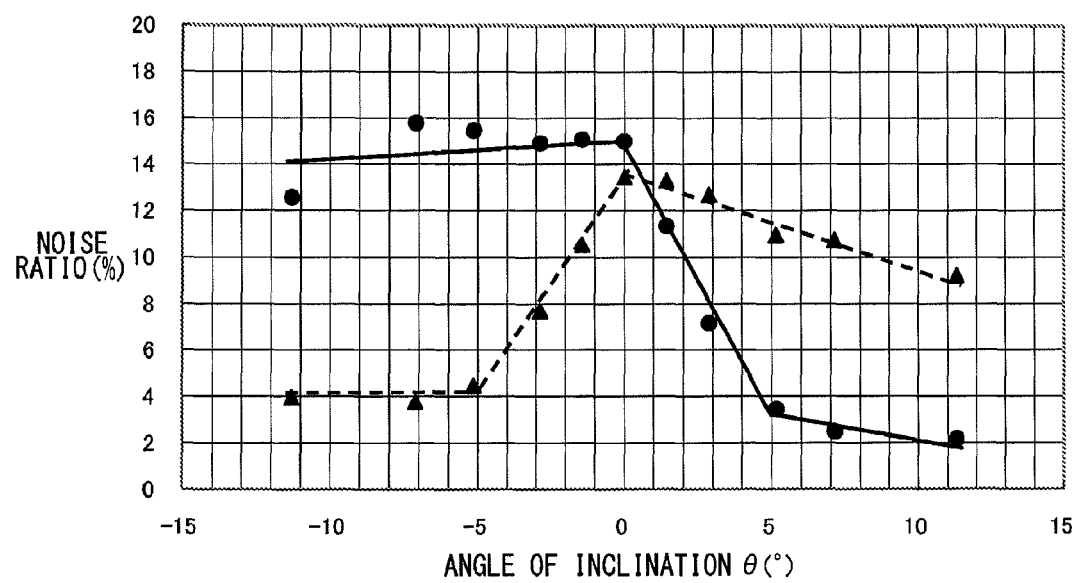
FIG. 24 shows a result of simulation of the erecting equal-magnification lens array plate according to yet another embodiment of the present invention.

FIG. 24 shows a result of simulation conducted in the erecting equal-magnification lens array plate according to still another exemplary embodiment of the present invention. FIG. 24 shows a result of simulation performed in the erecting equal-magnification lens array plate 11 shown in FIG. 2 and in the erecting equal-magnification lens array plate 411 shown in FIG. 7. More specifically, the conditions for simulation in the erecting equal-magnification lens array plate 11 are such that the conjugation length TC=9.9 mm, the lens arrangement pitch=0.8 mm, the lens diameter=0.6 mm, the gap=1.0 mm, the lens thickness=1.15 mm, the diameter of the opening of the first surface light-shielding wall=0.6 mm, the height of the first surface light-shielding wall≈0.0 mm, the diameter of the opening of the fourth surface light-shielding wall facing the image plane=0.5 mm, the diameter of the opening of the fourth surface light-shielding wall at the fourth surface=0.55 mm, and the height of the fourth surface light-shielding wall=0.5 mm. The conditions for simulation in the erecting equal-magnification lens array plate 411 are such that the conjugation length TC=9.9 mm, the lens arrangement pitch=0.8 mm, the lens diameter=0.6 mm, the gap=1.0 mm, the lens thickness=1.15 mm, the diameter of the opening of the first surface light-shielding wall facing the object plane=0.5 mm, the diameter of the opening of the first surface light-shielding wall at the first surface=0.55 mm, the height of the first surface light-shielding wall=0.5 mm, the diameter of the opening of the fourth surface light-shielding wall=0.6 mm, and the height of the fourth surface light-shielding wall≈0.0 mm. Referring to FIG. 24, the solid line represents the result of simulation in the erecting equal-magnification lens array plate 11 and the broken line represents the result of simulation in erecting equal-magnification lens array plate 411.

As indicated by the solid line in FIG. 24, as the angle of inclination θ is positively increased from 0°, the noise ratio in the erecting equal-magnification lens array plate 11 is suppressed at a low level at angles of inclination larger than the angle at the folding point in absolute value which occurs when the angle of inclination≈+5°. However, the folding point of the noise ratio does not occur and the noise ratio cannot be substantively lowered as the angle of inclination is negatively increased in absolute value from 0°. This indicates that the intermediate through hole 34a of the erecting equal-magnification lens array plate 11 shown in FIG. 2 need be formed such that the diameter is progressively smaller in a tapered fashion away from the second surface 24d toward the third surface 26c.

As indicated by the broken line in FIG. 24, as the angle of inclination θ is negatively increased in absolute value from 0°, the noise ratio in the erecting equal-magnification lens array plate 411 is suppressed at a low level at angles of inclination larger than the angle at the folding point in absolute value which occurs when the angle of inclination≈−5°. However, the folding point of the noise ratio does not occur and the noise ratio cannot be substantively lowered as the angle of inclination is positively increased from 0°. This indicates that the intermediate through hole 34a of the erecting equal-magnification lens array plate 411 shown in FIG. 7 need be formed such that the diameter is progressively larger in a inversely tapered fashion away from the second surface 24d toward the third surface 26c.

Figure 25:
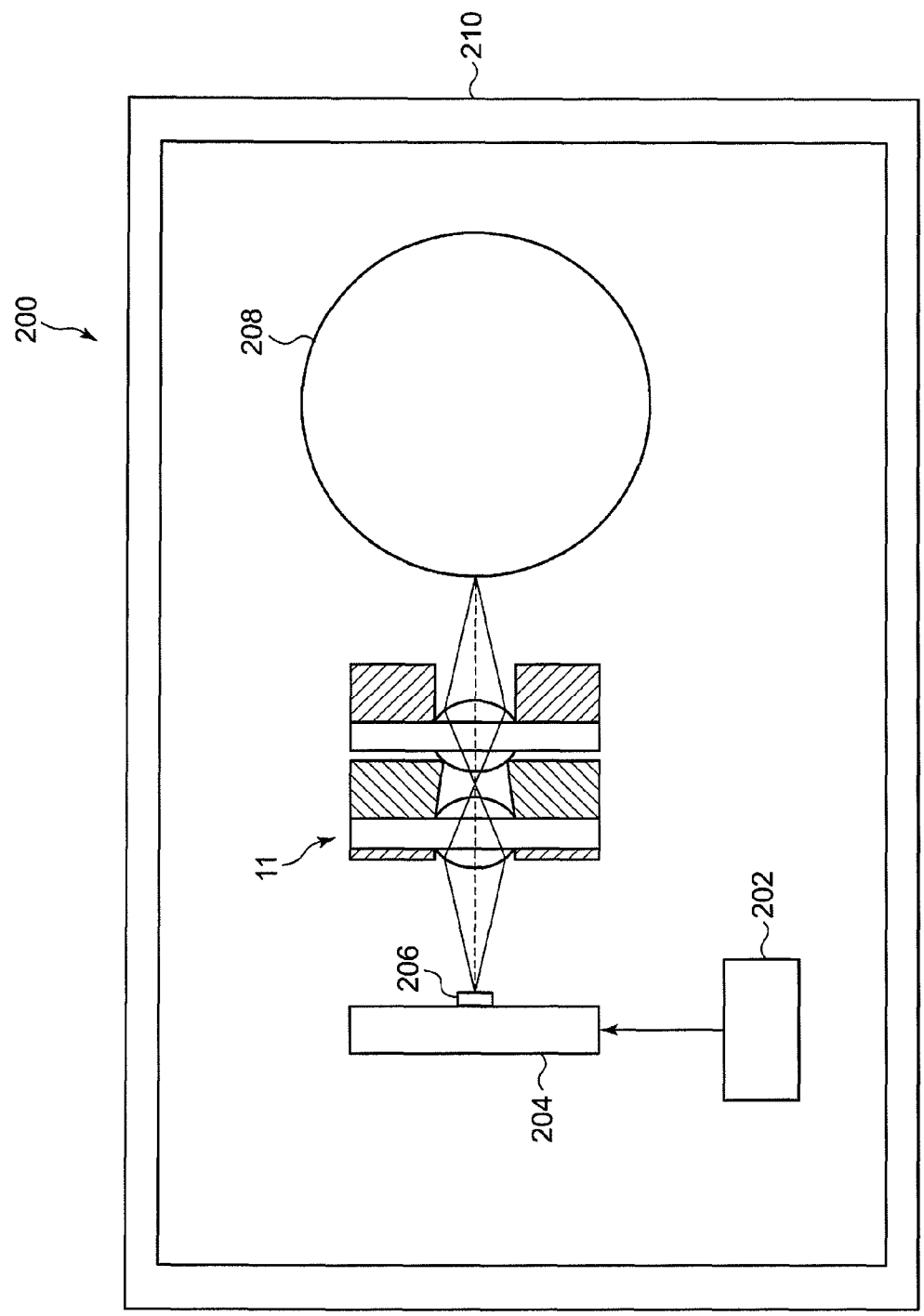
FIG. 25 shows an image writing device according to another embodiment of the present invention.

FIG. 25 shows an image writing device 200 according to another embodiment of the present invention. As shown in FIG. 25, the image writing device 200 comprises an LED array 206 comprising an array of a plurality of LED's, a substrate 204 on which the LED array 206 is mounted, a control unit 202 configured to control the LED array 206, the aforementioned erecting equal-magnification lens array plate 11 for condensing light emitted from the LED array 206, a photosensitive drum 208 for receiving the light transmitted through the erecting equal-magnification lens array plate 11, and a housing 210 accommodating the components. In FIG. 25, the developer device, the transferring device, etc. provided around the photosensitive drum 208 are omitted from the illustration.

The image writing device 200 is provided with an LED print head which uses LED's as light sources. When an LED print head is used, pixels correspond one to one to light-emitting sources so that no mechanisms for scanning in the main scanning direction are necessary. Therefore, the size and weight of the device can be reduced as compared with a laser raster output scanner system in which a laser light source and a polygon mirror are combined.

In the related art, a rod lens array is used as an erecting equal-magnification lens array plate in a device in which an LED print head is used. By using the erecting equal-magnification lens array plate 11 according to the present invention, the price of the image writing device 200 can be reduced. By using the erecting equal-magnification lens array plate 11 according to the present invention, a high-quality image in which flare noise is reduced can be formed on the photosensitive drum 208.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described, lenses on the respective lens surfaces are arranged in a single row in the main scanning direction. Alternatively, lenses may be arranged in two rows in the main scanning direction or arranged in a square array to reduce flare noise as well.

What is claimed is:

1. An erecting equal-magnification lens array plate comprising:
   a first lens array plate provided with a plurality of first lenses systematically arranged on a first surface and a plurality of second lenses systematically arranged on a second surface opposite to the first surface; and
   a second lens array plate provided with a plurality of third lenses systematically arranged on a third surface and a plurality of fourth lenses systematically arranged on a fourth surface opposite to the third surface;
   wherein the first lens array plate and the second lens array plate form a stack such that the second surface and the third surface face each other to ensure that a combination of the lenses aligned with each other form a coaxial lens system, and an erect equal-magnification image of an object on the first surface side on an image plane facing the fourth surface,
   the erecting equal-magnification lens array plate further comprising:
   a fourth surface light-shielding wall provided with a plurality of fourth surface through holes corresponding to the fourth lenses and provided on the fourth surface such that the fourth surface through holes are located directly opposite to the corresponding fourth lenses; and
   an intermediate light-shielding wall provided with a plurality of intermediate through holes corresponding to the second and third lenses and provided between the first lens array plate and the second lens array plate such that the intermediate through holes are located directly opposite to the corresponding second and third lenses,
   wherein the intermediate through hole is formed such that the hole diameter is progressively smaller in a tapered fashion away from the second surface toward the third surface, and
   an angle of inclination θ of an interior wall surface of the intermediate through hole with respect to a optical axis is given by $$\theta \geq \tan^{-1}(D4/(Gap+L2+H4))/2,$$

where Gap denotes a gap between the first lens array plate and the second lens array plate, L2 denotes a thickness of the second lens array plate, H4 denotes a height of the fourth surface light-shielding wall, and D4 denotes a diameter of the opening of the fourth surface through hole facing the image plane.

2. The erecting equal-magnification lens array plate according to claim 1,
   wherein the angle of inclination θ of an interior wall surface of the intermediate through hole with respect to a optical axis is given by $$\tan^{-1}(D4/(Gap+L2+H4))/2 \leq \theta \leq \tan^{-1}((P+D4)/2/(Gap+L2+H4)).$$

3. The erecting equal-magnification lens array plate according to claim 1, further comprising:
   a first surface light-shielding wall provided with a plurality of first surface through holes corresponding to the first lenses and provided on the first surface such that the first surface through holes are located directly opposite to the corresponding first lenses.

4. An optical scanning unit comprising:
   a linear light source configured to illuminate an original to be read;
   the erecting equal-magnification lens array plate according to claim 1 configured to condense light reflected by the original to be read; and
   a linear image sensor configured to receive light transmitted by the erecting equal-magnification lens array plate.

5. An image reading device comprising:
   the optical scanning unit according to claim 4; and
   an image processing unit configured to process an image signal detected by the optical scanning unit.

6. An image writing device comprising:
   an LED array comprising an array of a plurality of LED's;
   the erecting equal-magnification lens array plate according to claim 1 for condensing light emitted from the LED array; and
   a photosensitive drum for receiving the light transmitted through the erecting equal-magnification lens array plate.

7. An erecting equal-magnification lens array plate comprising:
   a first lens array plate provided with a plurality of first lenses systematically arranged on a first surface and a plurality of second lenses systematically arranged on a second surface opposite to the first surface; and
   a second lens array plate provided with a plurality of third lenses systematically arranged on a third surface and a plurality of fourth lenses systematically arranged on a fourth surface opposite to the third surface;
   wherein the first lens array plate and the second lens array plate form a stack such that the second surface and the third surface face each other to ensure that a combination of the lenses aligned with each other form a coaxial lens system, and an erect equal-magnification image of an object on the first surface side on an image plane facing the fourth surface,
   the erecting equal-magnification lens array plate further comprising:
   a first surface light-shielding wall provided with a plurality of first surface through holes corresponding to the first lenses and provided on the first surface such that the first surface through holes are located directly opposite to the corresponding first lenses,
   an intermediate light-shielding wall provided with a plurality of intermediate through holes corresponding to the second and third lenses and provided between the first lens array plate and the second lens array plate such that the intermediate through holes are located directly opposite to the corresponding second and third lenses, wherein the intermediate through hole is formed such that the hole diameter is progressively larger in an inversely tapered fashion away from the second surface toward the third surface, and an angle of inclination θ of an interior wall surface of the intermediate through hole with respect to a optical axis is given by $$\theta \geq \tan^{-1}(D1/(Gap+L1+H1))/2,$$

where Gap denotes a gap between the first lens array plate and the second lens array plate, L1 denotes a thickness of the first lens array plate, H1 denotes a height of the first surface light-shielding wall, and D1 denotes a diameter of the opening of the first surface through hole facing the object plane.

8. The erecting equal-magnification lens array plate according to claim 7, wherein the angle of inclination θ of an interior wall surface of the intermediate through hole with respect to a optical axis is given by $$\tan^{-1}(D1/(Gap+L1+H1))/2 \leq \theta \leq \tan^{-1}((P+D1)/2/(Gap+L1+H1)).$$

9. The erecting equal-magnification lens array plate according to claim 7, further comprising:

a fourth surface light-shielding wall provided with a plurality of fourth surface through holes corresponding to the fourth lenses and provided on the fourth surface such that the fourth surface through holes are located directly opposite to the corresponding fourth lenses.

10. An optical scanning unit comprising:

a linear light source configured to illuminate an original to be read;

the erecting equal-magnification lens array plate according to claim 7 configured to condense light reflected by the original to be read; and a linear image sensor configured to receive light transmitted by the erecting equal-magnification lens array plate.

11. An image reading device comprising:

the optical scanning unit according to claim 10; and an image processing unit configured to process an image signal detected by the optical scanning unit.

12. An image writing device comprising:

an LED array comprising an array of a plurality of LED's;

the erecting equal-magnification lens array plate according to claim 7 for condensing light emitted from the LED array; and a photosensitive drum for receiving the light transmitted through the erecting equal-magnification lens array plate.

* * * * *